(12) United States Patent
Xue et al.

(10) Patent No.: US 11,711,849 B2
(45) Date of Patent: Jul. 25, 2023

(54) NETWORK CONTROLLED SIDELINK OFF-LOADING OVER UNLICENSED CARRIER

(71) Applicant: QUALCOMM INCORPORATED, San Diego, CA (US)

(72) Inventors: Yisheng Xue, San Diego, CA (US); Jing Sun, San Diego, CA (US); Chih-Hao Liu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 17/301,652

(22) Filed: Apr. 9, 2021

(65) Prior Publication Data
US 2021/0368542 A1 Nov. 25, 2021

Related U.S. Application Data

(60) Provisional application No. 63/029,176, filed on May 22, 2020.

(51) Int. Cl.
*H04W 74/08* (2009.01)
*H04W 72/23* (2023.01)

(52) U.S. Cl.
CPC ....... *H04W 74/0816* (2013.01); *H04W 72/23* (2023.01); *H04W 74/0808* (2013.01)

(58) Field of Classification Search
CPC ........... H04W 74/0816; H04W 72/042; H04W 74/006; H04W 72/23; H04W 74/0808
(Continued)

(56) References Cited

U.S. PATENT DOCUMENTS

| 10,009,920 B2 * | 6/2018 | Rico Alvarino ...... H04L 5/0053 |
| 2019/0261412 A1* | 8/2019 | Novlan ............. H04W 72/0413 |

(Continued)

FOREIGN PATENT DOCUMENTS

| BR | 112021013508 A2 * | 9/2021 | ........... H04L 1/1812 |
| WO | WO-2020034335 A1 * | 2/2020 | ........... H04L 5/0005 |

(Continued)

OTHER PUBLICATIONS

Interdigital, Inc: "NR Sidelink Mode 1 Resource Allocation", 3GPP Draft, R1-1911277, 3GPP TSG RAN WG1 #98bis, NR Sidelink Mode 1 Resource Allocation_Final, 3rd Generation Partnership Project (3GPP), Mobile Competence Centre, 650, Route Des Lucioles, F-06921 Sophia-Antipolis Cedex, Fr, vol. RAN WG1, No. Chongqing, China, Oct. 14, 2019-Oct. 20, 2019, Oct. 7, 2019 (Oct. 7, 2019), XP051809027, 6 Pages, Retrieved from the Internet: URL:https://ftp.3gpp.org/tsg_ran/WG1_RL1/TSGR1_98b/Docs/R1-1911277.zip R1-1911277 NR Sidelink Mode 1 Resource Allocation_final.docx [retrieved-on Oct. 7, 2019] 2.5 DCI contents.

(Continued)

*Primary Examiner* — Rownak Islam
(74) *Attorney, Agent, or Firm* — Haynes and Boone, LLP

(57) ABSTRACT

Wireless communications systems and methods related to sidelink communications in an unlicensed frequency band are provided. A user equipment (UE) receives, from a base station (BS), a first downlink control information (DCI) associated with a first listen-before-talk (LBT) time. The UE determines a first sidelink transmission opportunity for communicating in an unlicensed frequency band at the first LBT time based on the first DCI.

30 Claims, 13 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2020/0100284 | A1* | 3/2020 | Li | H04W 74/0808 |
| 2020/0106566 | A1* | 4/2020 | Yeo | H04W 28/04 |
| 2022/0201753 | A1* | 6/2022 | Zhang | H04W 74/0808 |
| 2022/0217690 | A1* | 7/2022 | Liu | H04W 4/70 |

FOREIGN PATENT DOCUMENTS

| | | | | |
|---|---|---|---|---|
| WO | WO-2020204565 A1 * | 10/2020 | | H04W 72/042 |
| WO | WO-2021149231 A1 * | 7/2021 | | |

OTHER PUBLICATIONS

International Search Report and Written Opinion—PCT/US2021/026790—ISA/EPO—dated Aug. 9, 2021 (204713WO).

Nokia, et al., "Remaining Issues on DL Signals and Channels", 3GPP TSG RAN WG1 Meeting #100e, R1-2000501, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Feb. 28, 2020, Feb. 14, 2020 (Feb. 14, 2020), XP051852898, 16 Pages, n 5. Retrieved from the Internet: URL:https://ftp.3gpp.org/tsg_ran/WG1_RL1/TSGR1_100_e/Docs/R1-2000501.zip, R1-2000501_DL Signals and Channels_NOKIA.docx [retrieved on Feb. 14, 2020] 5 Support of new URLLC DCI formats 0-2 & 1_2 for NR-U, Sectio.

Oppo: "Discussion on Multiple Configured Grants", 3GPP Draft, R2-2000202, 3GPP TSG-RAN WG2 Meeting #109, 3rd Generation Partnership Project (3GPP), Mobile Competence Centre, 650, Route Des Lucioles, F-06921 Sophia-Antipolis Cedex, France, vol. RAN WG2, No. Feb. 24, 2020-Feb. 28, 2020, Feb. 14, 2020 (Feb. 14, 2020), XP051848855, pp. 1-4, Retrieved from the Internet: URL:https://ftp.3gpp.org/tsg_ran/WG2_RL2/TSGR2_109_e/Docs/R2-2000202.zip, R2-2000202-Discussion on multiple configured grants.doc [retrieved on Feb. 14, 2020] p. 2, second alternative.

* cited by examiner

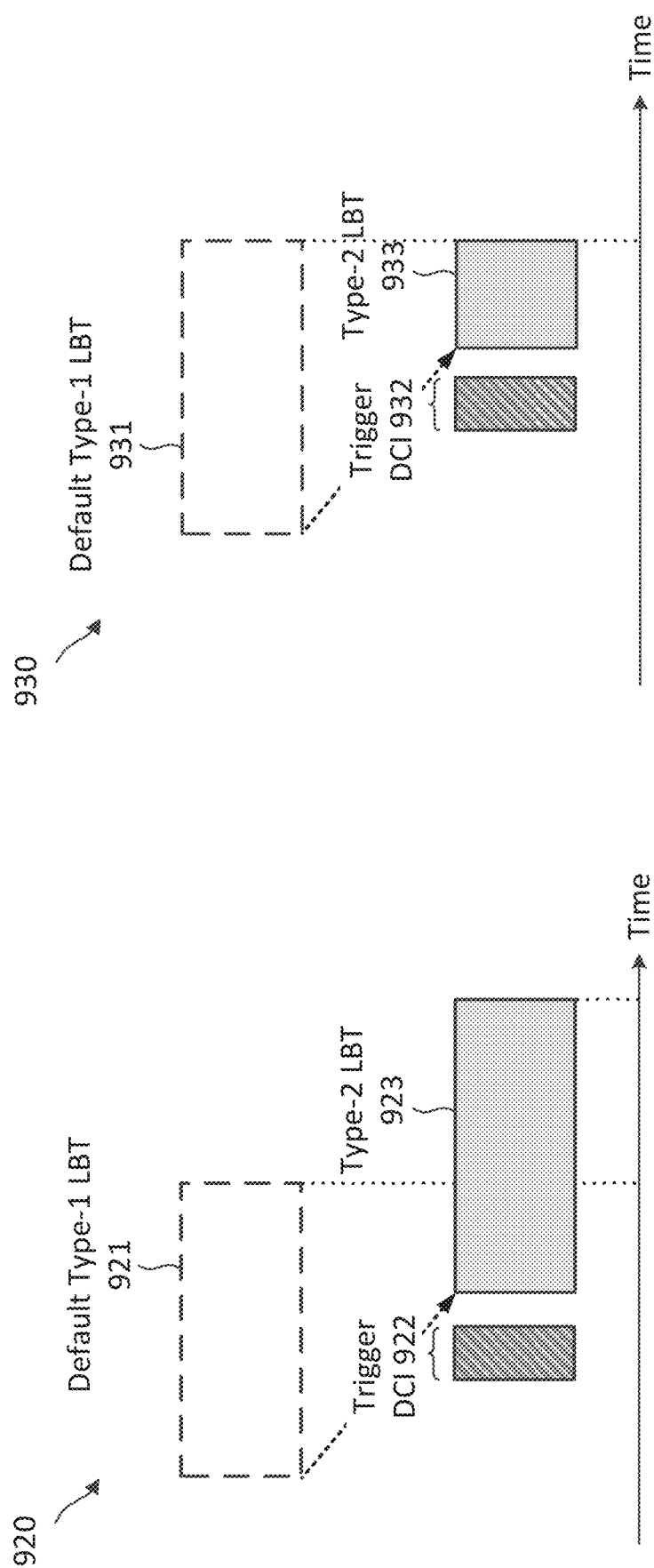

NETWORK CONTROLLED SIDELINK OFF-LOADING OVER UNLICENSED CARRIER

CROSS REFERENCE TO RELATED APPLICATIONS

The present application claims priority to and the benefit of U.S. Provisional Patent Application No. 63/029,176, filed May 22, 2020, which is hereby incorporated by reference in its entirety as if fully set forth below and for all applicable purposes.

TECHNICAL FIELD

This application relates to wireless communication systems, and more particularly to sidelink communications.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink (SL) was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications for various use cases.

BRIEF SUMMARY OF SOME ASPECTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first user equipment (UE) includes receiving, by the UE from a base station (BS), a first downlink control information (DCI) associated with a first listen-before-talk (LBT) time, and determining, by the UE, a first sidelink transmission opportunity for communicating in an unlicensed frequency band at the first LBT time based on the first DCI.

In an aspect of the disclosure, a method of wireless communication performed by a base station (BS) includes determining, by the BS, a first sidelink transmission opportunity for communicating in an unlicensed frequency band at a first listen-before-talk (LBT) time, and transmitting, by the BS to a user equipment (UE) in a licensed frequency band, a first downlink control information (DCI) associated with the determined first sidelink transmission opportunity.

In an aspect of the disclosure, a first user equipment (UE) comprises a transceiver configured to receive, from a base station (BS), a first downlink control information (DCI) associated with a first listen-before-talk (LBT) time, and a processor configured to determine a first sidelink transmission opportunity for communicating in an unlicensed frequency band at the first LBT time based on the first DCI.

In an aspect of the disclosure, a base station (BS) comprises a processor configured to determine a first sidelink transmission opportunity for communicating in an unlicensed frequency band at a first listen-before-talk (LBT) time, and a transceiver configured to transmit, to a user equipment (UE) in a licensed frequency band, a first downlink control information (DCI) associated with the determined first sidelink transmission opportunity.

In an aspect of the disclosure, a non-transitory computer-readable medium having program code recorded thereon, the program code, when executed by a processor in a first user equipment (UE), comprising code for causing the first UE to receive, from a base station (BS), a first downlink control information (DCI) associated with a first listen-before-talk (LBT) time, and determine a first sidelink transmission opportunity for communicating in an unlicensed frequency band at the first LBT time based on the first DCI.

In an aspect of the disclosure, a non-transitory computer-readable medium having program code recorded thereon, the program code, when executed by a processor in a base station (BS), comprising code for causing the BS to determine a first sidelink transmission opportunity for communicating in an unlicensed frequency band at a first listen-before-talk (LBT) time, and transmit, to a user equipment (UE) in a licensed frequency band, a first downlink control information (DCI) associated with the determined first sidelink transmission opportunity.

In an aspect of the disclosure, a first user equipment (UE) comprises means for receiving, from a base station (BS), a first downlink control information (DCI) associated with a first listen-before-talk (LBT) time, and means for determining a first sidelink transmission opportunity for communicating in an unlicensed frequency band at the first LBT time based on the first DCI.

In an aspect of the disclosure, a base station (BS) comprises means for determining a first sidelink transmission opportunity for communicating in an unlicensed frequency band at a first listen-before-talk (LBT) time, and means for transmitting, to a user equipment (UE) in a licensed frequency band, a first downlink control information (DCI) associated with the determined first sidelink transmission opportunity.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIGS. 9A-9D illustrate sidelink communication schemes according to some aspects of the present disclosure.

DETAILED DESCRIPTION

Figure 1:
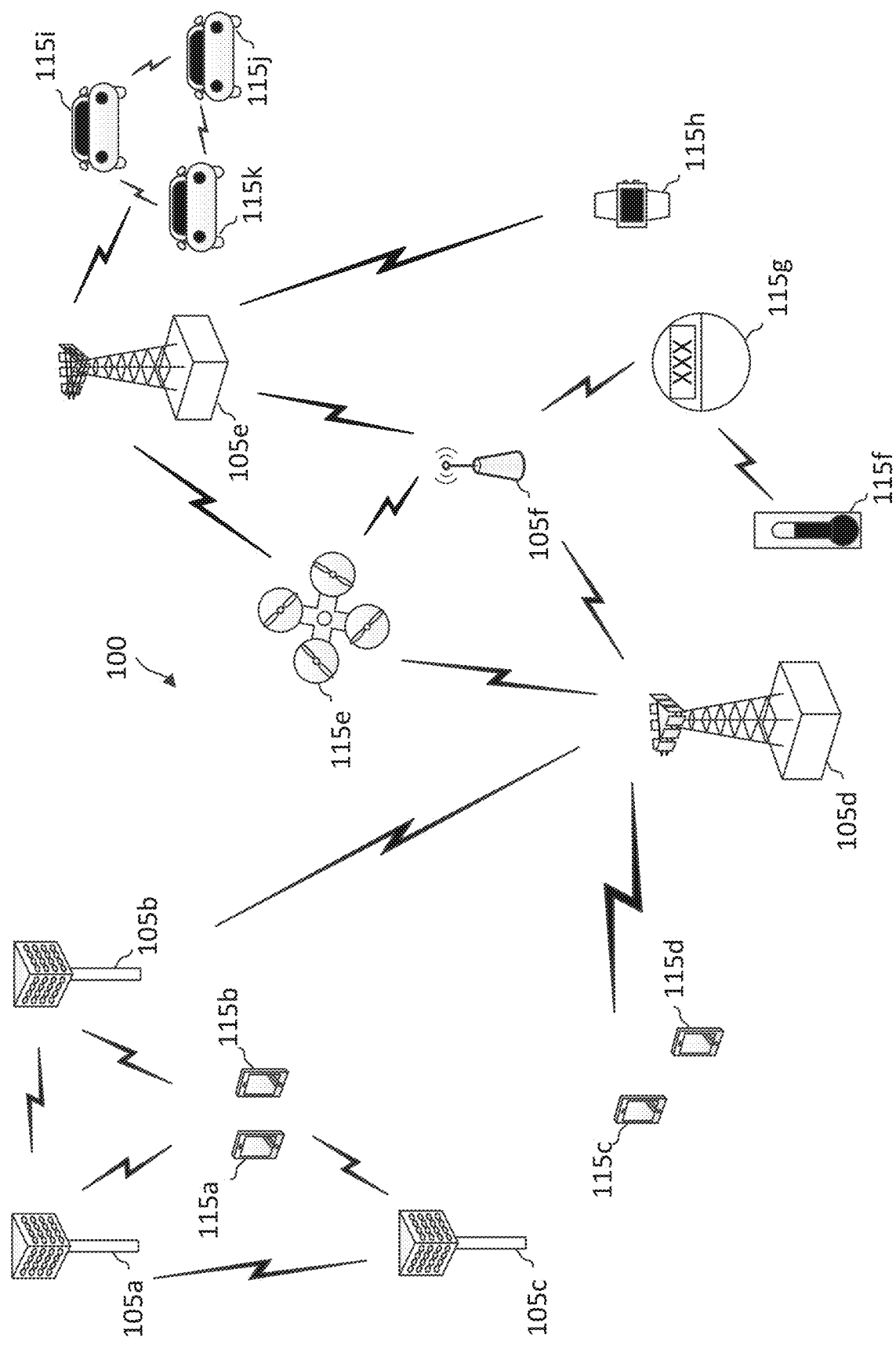
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive internet of things (IoTs) with a ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Sidelink communications refers to the communications among user equipment devices (UEs) without tunneling through a base station (BS) and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communication may include, among others, vehicle-to-everything (V2X), industrial IoT (IIoT), and/or NR-lite.

NR supports two modes of radio resource allocations (RRA)—a mode-1 RRA and a mode-2 RRA—for sidelink over a licensed spectrum. The mode-1 RRA supports network controlled RRA that can be used for in-coverage sidelink communication. For instance, a serving BS may determine a radio resource on behalf of a sidelink UE and transmit an indication of the radio resource to the sidelink UE. The mode-2 RRA supports autonomous RRA that can be used for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communication.

The deployment of NR over an unlicensed spectrum is referred to as NR-unlicensed (NR-U). Some studies have been conducted for NR-U deployment over 5 gigahertz (GHz) unlicensed bands. Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink can benefit from utilizing the additional bandwidth available in an unlicensed spectrum.

The present application describes mechanisms for determining a sidelink transmission opportunity for communicating in an unlicensed frequency band. In some aspects, a user equipment (UE) receives, from a base station (BS), a first downlink control information (DCI) associated with a first listen-before-talk (LBT) time. In some aspects, the UE determines a first sidelink transmission opportunity for communicating in an unlicensed frequency band at the first LBT time based on the first DCI. In some aspects, a BS determines a first sidelink transmission opportunity for communicating in an unlicensed frequency band at a first listen-before-talk (LBT) time. In some aspects, the BS transmits to a user equipment (UE) in a licensed frequency band, a first downlink control information (DCI) associated with the determined first sidelink transmission opportunity.

In some aspects, the first DCI is received in a licensed frequency band and further associated with a second LBT trigger opportunity. In some aspects, the UE receives from a first wireless communication device (e.g., the BS, a side-link proxy UE, or another transmission and reception point (TRP)), a second LBT trigger associated with a second LBT time based on the second LBT trigger opportunity. In some aspects, the UE or BS determines a second sidelink transmission opportunity for communicating in the unlicensed frequency band at the second LBT time based on the communicated second LBT trigger. In some aspects, the UE transmits to a second wireless communication device, in an unlicensed-band a first transmission in a physical sidelink shared channel (PSSCH) at one of the first sidelink transmission opportunity or the second sidelink transmission opportunity.

In some aspects, the UE determines a first set of one or more sidelink transmission opportunities contiguous with the determined first sidelink transmission opportunity based on the first DCI. In some aspects, a first group of contiguous transmission opportunities includes each of the determined first sidelink transmission opportunity and the first set of transmission opportunities. In some aspects, the UE transmits to a second wireless communication device, in an unlicensed-band a first plurality of transmissions in the first group of contiguous transmission opportunities. In some aspects, the first plurality of transmissions is associated with a plurality of different transport blocks (TBs). In some aspects, each of the plurality of different TBs is associated with a hybrid automatic repeat request (HARQ) process identifier, a new data indicator (NDI), and a redundancy version (RV). In some aspects, each of the first set of sidelink transmission opportunities is associated with a type-1 LBT procedure.

In some aspects, the UE determines a second set of one or more sidelink transmission opportunities contiguous with the determined second sidelink transmission opportunity based on the first DCI. In some aspects, a second group of contiguous transmission opportunities includes each of the determined second sidelink transmission opportunity and the second set of transmission opportunities. In some aspects, the UE transmits to a second wireless communication device, in an unlicensed-band a second plurality of transmissions in the second group of contiguous transmission opportunities. In some aspects, the second plurality of transmissions is associated with a plurality of different transport blocks (TBs). In some aspects, each of the plurality of different TBs is associated with a hybrid automatic repeat request (HARQ) process identifier, a new data indicator (NDI), and a redundancy version (RV).

In some aspects, the first sidelink transmission opportunity is associated with a cyclic prefix (CP) extension configuration based on the first DCI. In some aspects, the first sidelink transmission opportunity is associated with a channel access priority class (CAPC) configuration based on the first DCI. In some aspects, the first sidelink transmission opportunity is associated with a type-1 LBT procedure. In some aspects, the second sidelink transmission opportunity is associated with a type-2 LBT procedure. In some aspects, the UE or BS determines a cyclic prefix (CP) extension configuration for the first sidelink transmission opportunity based on one of a system information block message or configuration or a radio resource control (RRC) message or configuration. In some aspects, the UE or BS determines a channel access priority class (CAPC) configuration based on one of a system information block configuration or a radio resource control (RRC) message configuration.

Aspects of the present disclosure can provide several benefits. For instance, the present disclosure includes network controlled sidelink over an unlicensed carrier, which beneficially provides the network with the flexibility to offload traffic from licensed carriers to unlicensed carriers. Additionally, the present disclosure includes using a CP extension to book a sidelink resource, which beneficially allows the scheduling of higher-priority sidelink communications with an early channel occupancy time (COT) starting point and lower-priority sidelink communications with a later COT. Further, the present disclosure beneficially includes configuring multiple contiguous PSSCHs for transmitting multiple TBs consecutively during a single LBT SL channel access, which beneficially increases throughput compared to transmitting non-contiguous TBs.

The present disclosure also includes a two-stage DCI technique, which beneficially provides the UE with a first DCI indicating a default SL access time using a type-1 LBT procedure, as well as an optional second DCI indicating an early or late access time (compared to the default access time) for using a type-2 LBT procedure. The two-stage DCI technique thus beneficially allows the UE to transmit PSSCHs early. The two-stage DCI technique also beneficially allows the network to upgrade the UE's SL access from type-1 LBT to type-2 LBT. The two-stage DCI technique also beneficially includes transmitting the second or trigger DCI in a common search space (CSS), which beneficially reduces DCI detection burdens on the UE compared to a UE-specific search space (USS). The two-stage DCI technique also includes transmitting the trigger DCI from the BS or a different transmission and reception point (TRP), such as a proxy UE, which beneficially provides network flexibility in selecting a trigger DCI transmitter and allows offloading the trigger DCI transmissions from a BS to another entity. In some aspects, the two-stage DCI technique allows the UE to prepare TBs based on the first DCI and transmit the TBs immediately after receiving the low-bit second trigger DCI, which requires little processing time and thus beneficially allows the UE to avoid delaying the transmission of the TBs due to the processing time for preparing the TBs, while also allowing the BS to avoid using a lengthy filler transmission to book the unlicensed channel while the UE prepares TBs. Additionally, the short processing time associated with the trigger DCI also reduces the chance of unlicensed carrier contamination (e.g., by a WiFi device) even in the case where the BS does not use a filler to reserve the carrier or channel for the UE. In some aspects, the present disclosure also includes more reliable control signaling via a rich-context first DCI over a licensed carrier and a low-bit trigger DCI over an unlicensed carrier.

The present disclosure further provides techniques for the UE receiving DCI over each of a licensed carrier or an unlicensed carrier, beneficially providing the network with flexibility for controlling SL resources. The present disclosure further provides techniques for a BS to perform type-1 LBT on an unlicensed carrier and check out the carrier to a UE for a COT, beneficially allowing the UE to access an unlicensed carrier with a reduced chance of contamination or interference by another device. The present disclosure therefore improves UE and network performance as to sidelink communications, beneficially providing higher data rates, higher capacity, better spectral efficiency, and increased reliability. The present disclosure further beneficially applies to various sidelink use cases including but not limited to device-to-device (D2D) communications, vehicle-to-everything (V2X) communications, cellular vehicle-to-everything (C-V2X) communications, industrial IoT (IIoT), NR-lite, enhanced mobile broadband (eMBB), ultra-reliable low latency communications (URLLC), and/or massive machine type communications (mMTC).

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel A TXOP may also be referred to as COT. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT1 LBT is also referred to as type-1 LBT herein. A CAT2 LBT refers to an LBT without a random backoff period. For instance, a transmitting node may determine a channel measurement in a time interval and determine whether the channel is available or not based on a comparison of the channel measurement against a ED threshold. A CAT2 LBT is also referred to as type-2 LBT herein. A CAT4 LBT refers to an LBT with a random backoff and a variable contention window (CW). For instance, a transmitting node may draw a random number and backoff for a duration based on the drawn random number in a certain time unit.

In some aspects, the network 100 may support sidelink communication among the UEs 115 over a shared radio frequency band (e.g., in a shared spectrum or an unlicensed spectrum). In some aspects, the UEs 115 may communicate with each other over a 2.4 GHz unlicensed band, 5 GHz unlicensed band, and/or 6 GHz unlicensed band, any of which may be shared by multiple network operating entities using various radio access technologies (RATs) such as NR-U, WiFi, and/or licensed-assisted access (LAA) as shown in FIG. 2.

In some aspects, the network 100 may include sidelink communications. In some aspects, network 100 or BS 105 (or, e.g., BS 205a of FIG. 2, BS 600 of FIG. 6) may configure a UE 115 (or, e.g., UE 215a1 of FIG. 2, UE 500 of FIG. 5) with sidelink transmission opportunities for transmitting to devices other than the BS, such as another UE 115 (or, e.g., UE 215a2 of FIG. 2, UE 500 of FIG. 5). In some aspects, the network 100 or BS 105 transmits to UE 115 a first DCI indicating a first sidelink transmission opportunity. In some aspects, the network 100 or BS 105 transmits to UE 115 a second or trigger DCI indicating a second sidelink transmission opportunity. In some aspects, the UE 115 transmits one or more TBs on one or more PSSCHs in an unlicensed band. In some aspects, the network 100 and/or BS 105 provides other information regarding the sidelink configuration to the UE, including via DCI(s) transmitted on licensed or unlicensed carriers, RRC messages, SIBs, and MAC-CEs. In some aspects, the BS 105 or UE 115 performs a type-1 or type-2 LBT procedure when transmitting on an unlicensed carrier.

Figure 2:
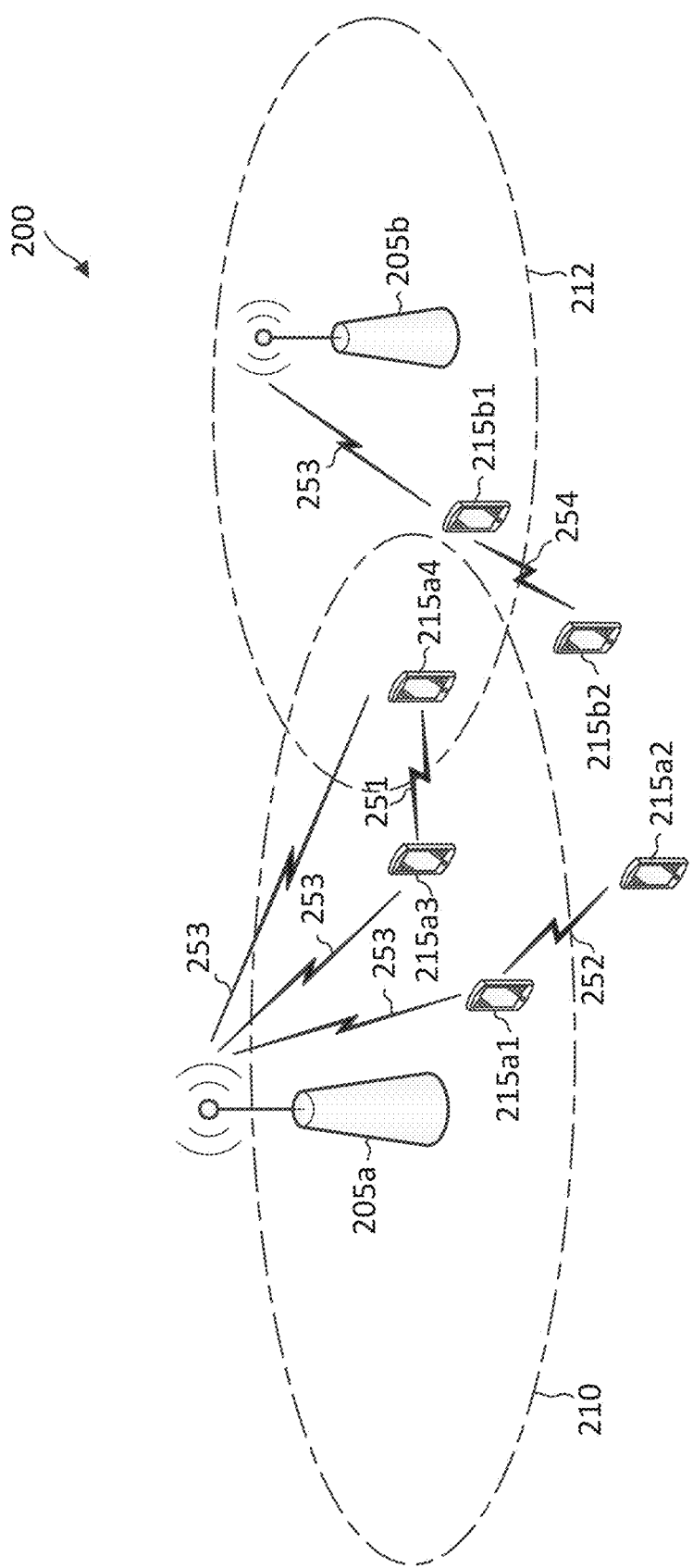
FIG. 2 illustrates a wireless communication network including sidelink communications according to some aspects of the present disclosure.

FIG. 2 illustrates an example of a wireless communication network 200 including sidelink communications according to embodiments of the present disclosure. The network 200 may correspond to a portion of the network 100. FIG. 2 illustrates two BSs 205 (shown as 205a and 205b) and six UEs 215 (shown as 215a1, 215a2, 215a3, 215a4, 215b1, and 215b2) for purposes of simplicity of discussion, though it will be recognized that embodiments of the present disclosure may scale to any suitable number of UEs 215 (e.g., the about 2, 3, 4, 5, 7 or more) and/or BSs 205 (e.g., the about 1, 3 or more). The BS 205 and the UEs 215 may be similar to the BSs 105 and the UEs 115, respectively. The BSs 205 and the UEs 215 may share the same radio frequency band for communications. In some instances, the radio frequency band may be a 2.4 GHz unlicensed band, a 5 GHz unlicensed band, or a 6 GHz unlicensed band. In general, the shared radio frequency band may be at any suitable frequency.

The BS 205a and the UEs 215a1-215a4 may be operated by a first network operating entity. The BS 205b and the UEs 215b1-215b2 may be operated by a second network operating entity. In some aspects, the first network operating entity may utilize a same RAT as the second network operating entity. For instance, the BS 205a and the UEs 215a1-215a4 of the first network operating entity and the BS 205b and the UEs 215b1-215b2 of the second network operating entity are NR-U devices. In some other aspects, the first network operating entity may utilize a different RAT than the second network operating entity. For instance, the BS 205a and the UEs 215a1-215a4 of the first network operating entity may utilize NR-U technology while the BS 205b and the UEs 215b1-215b2 of the second network operating entity may utilize WiFi or LAA technology.

In the network 200, some of the UEs 215a1-215a4 may communicate with each other in peer-to-peer communications. For example, the UE 215a1 may communicate with the UE 215a2 over a sidelink 252, the UE 215a3 may communicate with the UE 215a4 over another sidelink 251, and the UE 215b1 may communicate with the UE 215b2 over yet another sidelink 254. The sidelinks 251, 252, and 254 are unicast bidirectional links. Some of the UEs 215 may also communicate with the BS 205a or the BS 205b in a UL direction and/or a DL direction via communication links 253. For instance, the UE 215a1, 215a3, and 215a4 are within a coverage area 210 of the BS 205a, and thus may be in communication with the BS 205a. The UE 215a2 is outside the coverage area 210, and thus may not be in direct communication with the BS 205a. In some instances, the UE 215a1 may operate as a relay for the UE 215a2 to reach the BS 205a. Similarly, the UE 215b1 is within a coverage area 212 of the BS 205b, and thus may be in communication with the BS 205b and may operate as a relay for the UE 215b2 to reach the BS 205b. In some aspects, some of the UEs 215 are associated with vehicles (e.g., similar to the UEs 115i-k) and the communications over the sidelinks 251, 252, and 254 may be C-V2X communications. C-V2X communications may refer to communications between vehicles and any other wireless communication devices in a cellular network.

Figure 3:
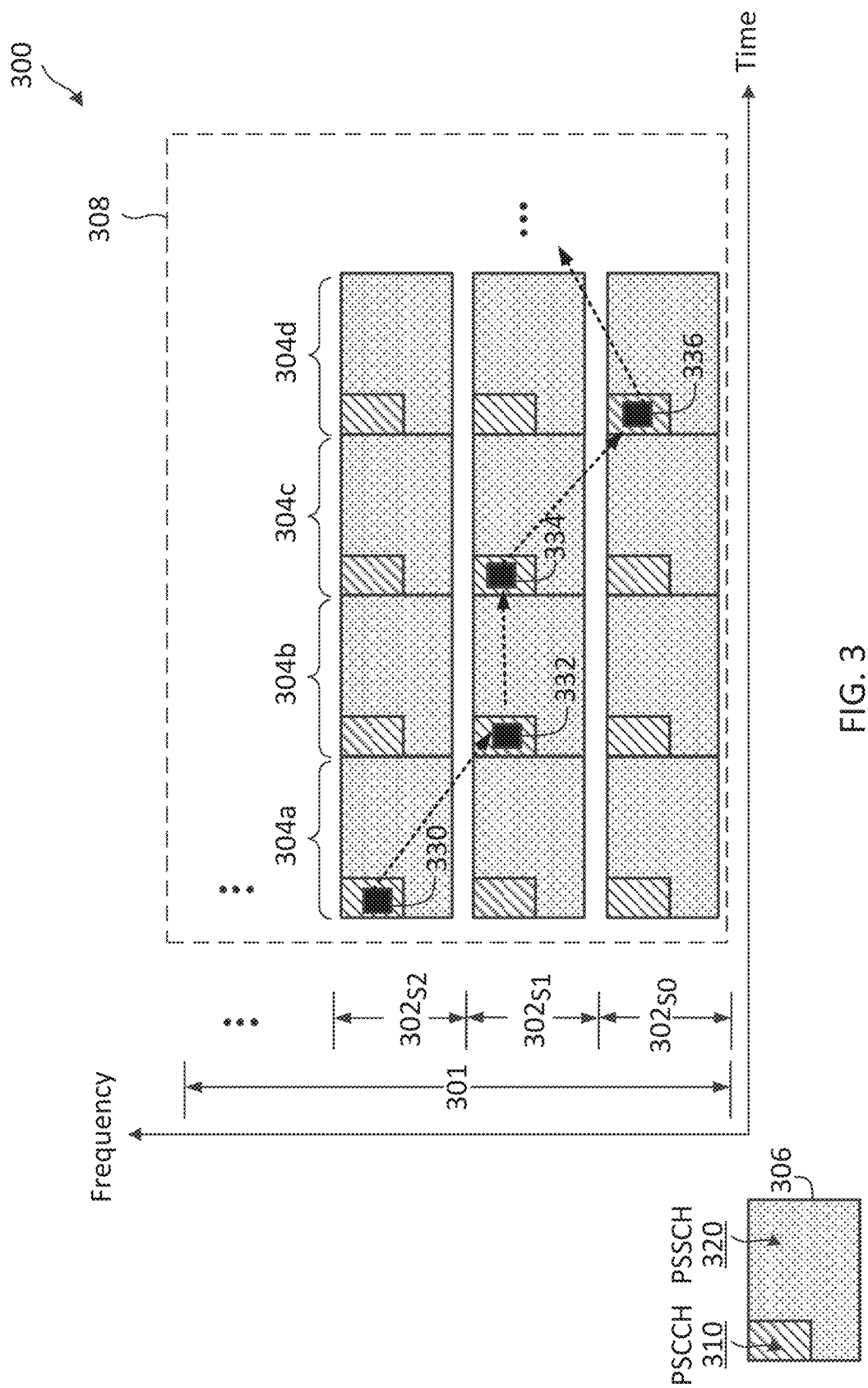
FIG. 3 illustrates a sidelink communication scheme according to some aspects of the present disclosure.

FIG. 3 illustrates a sidelink communication scheme 300 according to some aspects of the present disclosure. The scheme 300 may be employed by UEs such as the UEs 115 and/or 215 in a network such as the networks 100 and/or 200. In particular, sidelink UEs may employ the scheme 300 to communicate sidelink over a shared radio frequency band (e.g., in a shared spectrum or an unlicensed spectrum). The shared radio frequency band may be shared by multiple RATs as discussed in FIG. 2. In FIG. 3, the x-axis represents time in some arbitrary units, and the y-axis represents frequency in some arbitrary units.

In the scheme 300, a shared radio frequency band 301 is partitioned into a plurality of subchannels or frequency subbands 302 (shown as $302_{S0}$, $302_{S1}$, $302_{S2}$, . . . ) in frequency and a plurality of sidelink frames 304 (shown as 304a, 304b, 304c, 304d, . . . ) in time for sidelink communication. The frequency band 301 may be at any suitable frequencies (e.g., at about or around 2.4 GHz, 5 GHz, or 6 GHz). The frequency band 301 may have any suitable BW and may be partitioned into any suitable number of frequency subbands 302. The number of frequency subbands 302 can be dependent on the sidelink communication BW requirement. The frequency band 301 may be at any suitable frequencies. In some aspects, the frequency band 301 is a 2.4

GHz unlicensed band and may have a bandwidth of about 80 megahertz (MHz) partitioned into about fifteen 5 MHz frequency subbands 302.

Each sidelink frame 304 includes a sidelink resource 306 in each frequency subband 302. A legend 305 indicates the types of sidelink channels within a sidelink resource 306. In some instances, there can be a frequency gap or guard band between adjacent frequency subbands 302 as shown in FIG. 3, for example, to mitigate adjacent band interference. The sidelink resource 306 may have a substantially similar structure as an NR sidelink resource. For instance, the sidelink resource 306 may include a number of subcarriers or RBs in frequency and a number of symbols in time. In some instances, the sidelink resource 306 may have a duration between about one millisecond (ms) to about 20 ms. Each sidelink resource 306 may include a PSCCH 310 and a PSSCH 320. The PSCCH 310 and the PSSCH 320 can be multiplexed in time and/or frequency. In the illustrated example of FIG. 3, for each sidelink resource 306, the PSCCH 310 is located during the beginning symbol(s) (e.g., about 1 symbol or about 2 symbols) of the sidelink resource 306 and occupies a portion of a corresponding frequency subband 302, and the PSSCH 320 occupies the remaining time-frequency resources in the sidelink resource 306. In some instances, a sidelink resource 306 may also include a physical sidelink feedback channel (PSFCH), for example, located during the ending symbol(s) of the sidelink resource 306. In general, a PSCCH 310, a PSSCH 320, and/or a PSFCH may be multiplexed in any suitable configuration within a sidelink resource 306.

The PSCCH 310 can be used for carrying SCI 330. The PSSCH 320 can be used for carrying sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IIoT application, the sidelink data may carry IIoT data (e.g., sensor measurements, device measurements, temperature readings, etc.). The PSFCH can be used for carrying feedback information, for example, HARQ ACK/NACK for sidelink data received in an earlier sidelink resource 306.

In an NR sidelink frame structure, the sidelink frames 304 in a resource pool 308 may be contiguous in time. A sidelink UE (e.g., the UEs 115 and/or 215) may include, in SCI 330, a reservation for a sidelink resource 306 in a later sidelink frame 304. Thus, another sidelink UE (e.g., a UE in the same NR-U sidelink system) may perform SCI sensing in the resource pool 308 to determine whether a sidelink resource 306 is available or occupied. For instance, if the sidelink UE detected SCI indicating a reservation for a sidelink resource 306, the sidelink UE may refrain from transmitting in the reserved sidelink resource 306. If the sidelink UE determines that there is no reservation detected for a sidelink resource 306, the sidelink UE may transmit in the sidelink resource 306. As such, SCI sensing can assist a UE in identifying a target frequency subband 302 to reserve for sidelink communication and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 302 in one sidelink frame 304 to another frequency subband 302 in another sidelink frame 304. In the illustrated example of FIG. 3, during the sidelink frame 304a, the sidelink UE transmits SCI 330 in the sidelink resource 306 located in the frequency subband $302_{S2}$ to reserve a sidelink resource 306 in a next sidelink frame 304b located at the frequency subband $302_{S1}$. Similarly, during the sidelink frame 304b, the sidelink UE transmits SCI 332 in the sidelink resource 306 located in the frequency subband $302_{S1}$ to reserve a sidelink resource 306 in a next sidelink frame 304c located at the frequency subband $302_{S1}$. During the sidelink frame 304c, the sidelink UE transmits SCI 334 in the sidelink resource 306 located in the frequency subband $302_{S1}$ to reserve a sidelink resource 306 in a next sidelink frame 304d located at the frequency subband $302_{S0}$. During the sidelink frame 304d, the sidelink UE transmits SCI 336 in the sidelink resource 306 located in the frequency subband $302_{S0}$. The SCI 336 may reserve a sidelink resource 306 in a later sidelink frame 304.

The SCI can also indicate scheduling information and/or a destination identifier (ID) identifying a target receiving sidelink UE for the next sidelink resource 306. Thus, a sidelink UE may monitor SCI transmitted by other sidelink UEs. Upon detecting SCI in a sidelink resource 306, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 304 in different frequency subband (e.g., via FDM). For instance, in the sidelink frame 304b, one pair of sidelink UEs may communicate sidelink data using a sidelink resource 306 in the frequency subband $302_{S2}$ while another pair of sidelink UEs may communicates sidelink data using a sidelink resource 306 in the frequency subband $302_{S1}$.

In some aspects, the scheme 300 is used for synchronous sidelink communication. In other words, the sidelink UEs are synchronized in time and are aligned in terms of symbol boundary, sidelink resource boundary (e.g., the starting time of sidelink frames 304). The sidelink UEs may perform synchronization in a variety of forms, for example, based on sidelink SSBs received from a sidelink UE and/or NR-U SSBs received from a BS (e.g., the BSs 105 and/or 205) while in-coverage of the BS. In some aspects, the sidelink UE may be preconfigured with the resource pool 308 in the frequency band 301, for example, while in a coverage of a serving BS. The resource pool 308 may include a plurality of sidelink resources 306. The BS can configure the sidelink UE with a resource pool configuration indicating resources in the frequency band 301 and/or the subbands 302 and/or timing information associated with the sidelink frames 304. In some aspects, the scheme 300 includes mode-2 RRA (e.g., supporting autonomous RRA that can be used for out-of-coverage sidelink UEs or partial-coverage sidelink UEs).

Figure 4:
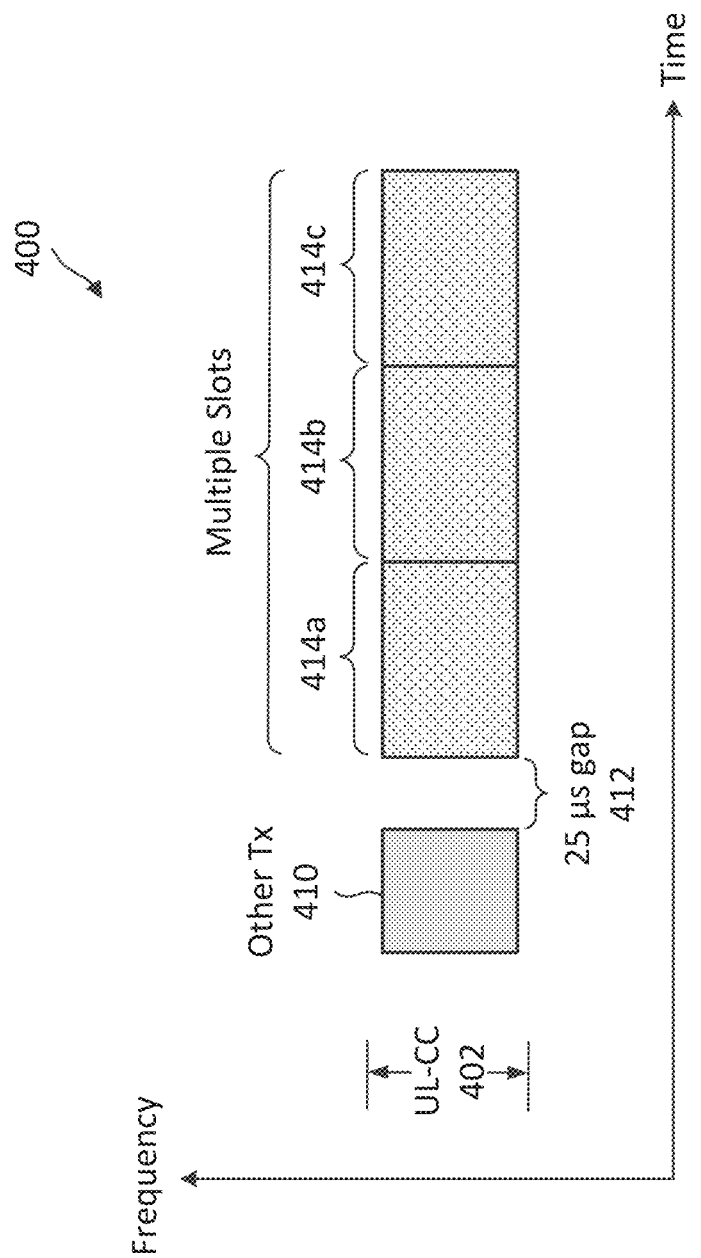
FIG. 4 illustrates a communication scheme in an unlicensed frequency band according to some aspects of the present disclosure.

FIG. 4 illustrates a communication scheme in an unlicensed frequency band according to some aspects of the present disclosure. The functionality of scheme 400 can be executed by a computing device (e.g., a processor, processing circuit, and/or other suitable component) of a wireless communication device or other suitable means. In some aspects, a wireless communication device such as the UE 115 or UE 500 may utilize one or more components, such as the processor 502, the memory 404, the sidelink module 508, the transceiver 510, the modem 512, and the one or more antennas 516, to execute the steps of scheme 400. Further, a wireless communication device such as the base station (BS) 105 or BS 600 may utilize one or more components, such as the processor 602, the memory 604, the sidelink module 608, the transceiver 610, the modem 612, and the one or more antennas 616, to execute the steps of scheme 400. The scheme 400 may employ similar mechanisms as described in FIGS. 1-3 and 5-12. In FIG. 4, the x-axis represents time in some arbitrary units, and the y-axis represents frequency in some arbitrary units.

As illustrated in FIG. 4, communications may be configured in an unlicensed component carrier (UL-CC) 402. In some aspects, a cyclic prefix (CP) extension can be used to configure transmissions within a gap of 16 or 25 microseconds (μs) 412 of a prior other transmission 410 in the UL-CC 402. In some aspects, a UE can use a CP extension to book or reserve a shared unlicensed carrier UL-CC 402 (e.g., in or around 2.4 GHz, 5 GHz, or 6 GHz) for a channel occupancy time (COT). In some aspects, for a Uu interface (e.g., between a UE and a BS, such as PUSCHs), the CP extension can configure multiple contiguous transmissions in multiple slots 414a, 414b, and 414c. In some aspects, the multiple contiguous transmissions in multiple slots 414a, 414b, and 414c may occur sequentially with a small or no time gap between transmissions. However, in some aspects, a network may not configure network-controlled transmission opportunities or grants (e.g., mode-1 RRA supporting network controlled RRA that can be used for in-coverage sidelink communication) in an unlicensed carrier. Moreover, in some aspects, a network may not configure network controlled contiguous transmission opportunities in an unlicensed carrier.

Accordingly, the present disclosure provides techniques for configuring network-controlled sidelink transmission opportunities in an unlicensed carrier. In some aspects, multiple contiguous sidelink transmission opportunities for transmitting multiple transport blocks may be configured in an unlicensed carrier. In some aspects, a UE and BS determine a first sidelink transmission opportunity based on a first DCI. In some aspects, the first DCI is associated with a trigger DCI opportunity. In some aspects, the UE receives a trigger DCI based on the trigger DCI opportunity. In some aspects, the BS configures and the UE determines a second sidelink transmission opportunity based on the trigger DCI.

Figure 5:
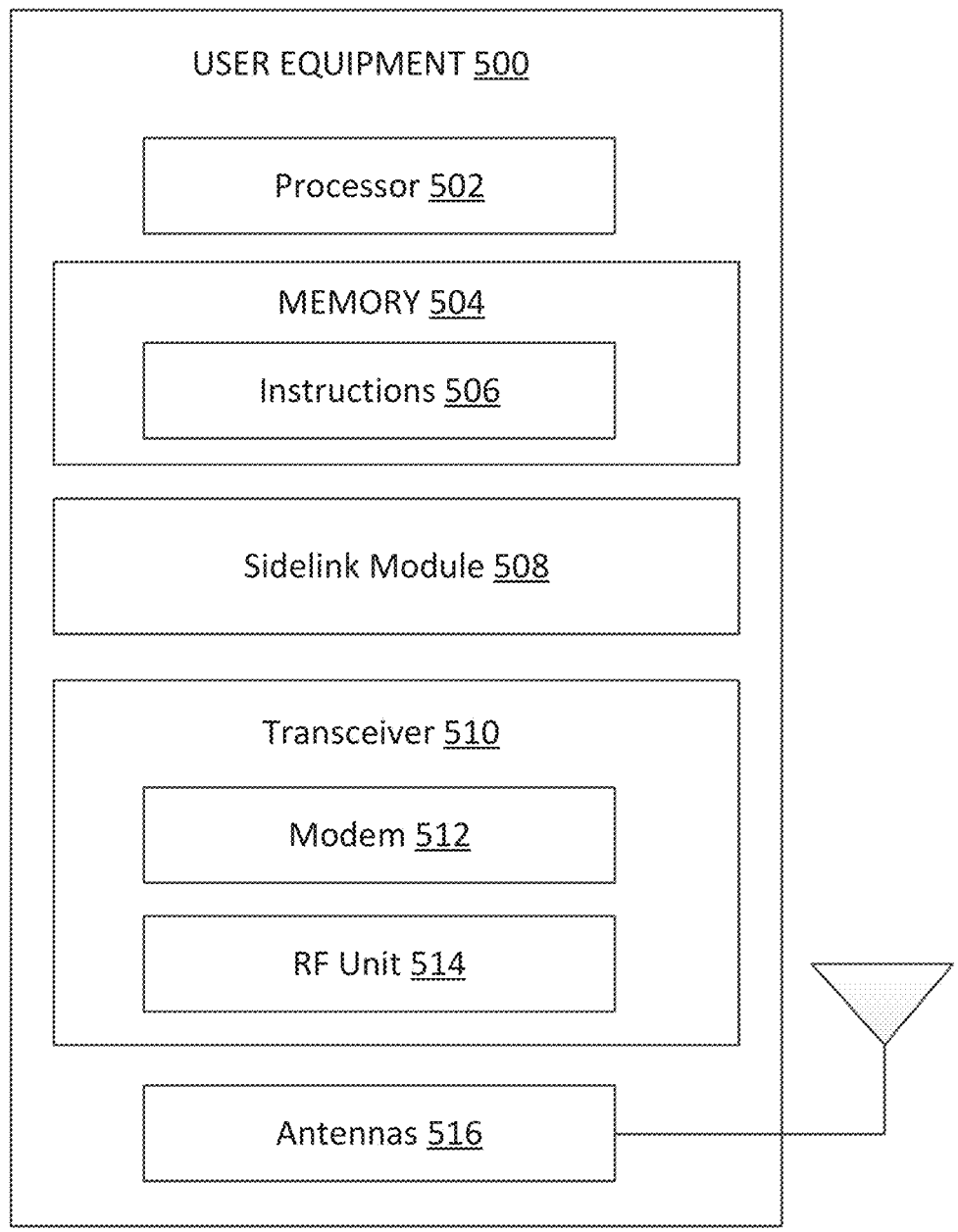
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1. As shown, the UE 500 may include a processor 502, a memory 504, a sidelink module 508, a transceiver 510 including a modem subsystem 512 and a radio frequency (RF) unit 514, and one or more antennas 516. These elements may be coupled with one another. The term "coupled" may refer to directly or indirectly coupled or connected to one or more intervening elements. For instance, these elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-4 and 7-12. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The sidelink module 508 may be implemented via hardware, software, or combinations thereof. For example, sidelink module 508 may be implemented as a processor, circuit, and/or instructions 506 stored in the memory 504 and executed by the processor 502. In some examples, the sidelink module 508 can be integrated within the modem subsystem 512. For example, the sidelink module 508 can be implemented by a combination of software components (e.g., executed by a DSP or a general processor) and hardware components (e.g., logic gates and circuitry) within the modem subsystem 512. In some examples, a UE may include one or more sidelink module 508.

The sidelink module 508 may be used for various aspects of the present disclosure, for example, aspects of FIGS. 1-4 and 7-12. In some aspects, the sidelink module 508 can be configured to receive and process DCI(s) and other messages received from a BS or other TRPs that include information associated with a sidelink configuration. In some aspects, the sidelink module 508 can be configured to perform sidelink transmissions on an unlicensed carrier in association with a network controlled sidelink configuration and a LBT procedure.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the configured transmission module 507 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., PUCCH, PUSCH, UCI, PSCCH, PSSCH, SCI, ACK/NACK, group ACK/NACK, CG uplink transmissions, channel report, SRS, LBT procedures, TBs) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., broadcast channels, DL data blocks, CC configurations, PDSCH, PDCCH, DCI, MCS, TPC, CSI-RS, ZP CSI-RS trigger, SPS configuration, SPS PDSCH, MAC-CE, group ACK codebook, dynamic grant (DG) configuration, configured grant (CG) configuration, DG PDCCH, reference signal, SIB, RRC messages, MAC-CE, sidelink configurations, CP configurations, CAPC configurations, LBT procedures, TBs) to the configured transmission module 507 for processing. The antennas 516 may include multiple antennas of similar or different designs in order to sustain multiple transmission links. The RF unit 514 may configure the antennas 516. In an example, the transceiver 510 is configured to receive, from a BS and other TRPs, DCI(s) regarding a sidelink configuration, and communicate, with a first wireless communication device (e.g., another UE) in a sidelink configuration on an unlicensed carrier, for example, by coordinating with the sidelink module 508.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
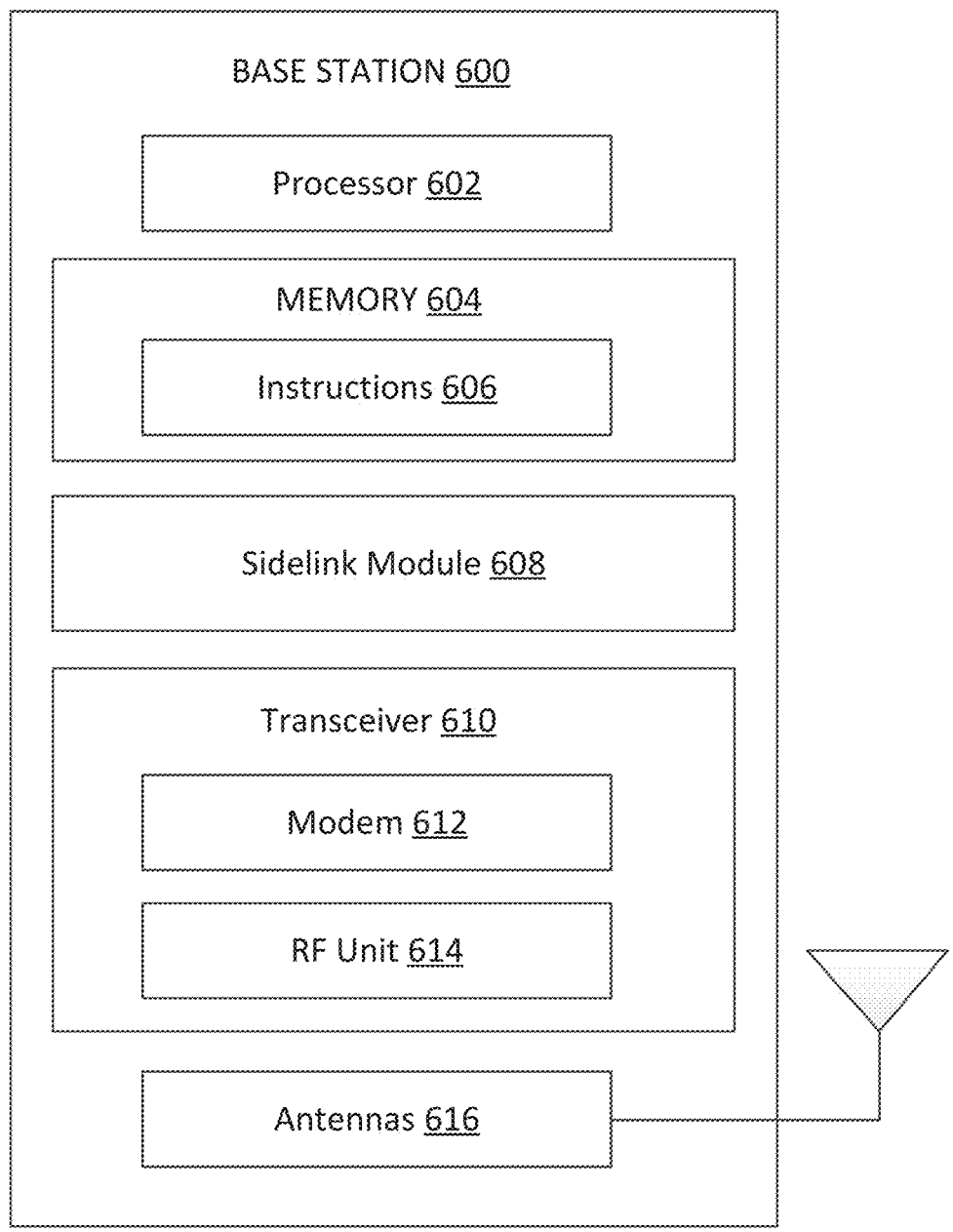
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1. A shown, the BS 600 may include a processor 602, a memory 604, sidelink module 608, a transceiver 610 including a modem subsystem 612 and a RF unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-4 and 7-12. Instructions 606 may also be referred to as code, which may be interpreted broadly to include any type of computer-readable statement(s) as discussed above with respect to FIG. 5.

The sidelink module 608 may be implemented via hardware, software, or combinations thereof. For example, the sidelink module 608 may be implemented as a processor, circuit, and/or instructions 606 stored in the memory 604 and executed by the processor 602. In some examples, the sidelink module 608 can be integrated within the modem subsystem 612. For example, the sidelink module 608 can be implemented by a combination of software components (e.g., executed by a DSP or a general processor) and hardware components (e.g., logic gates and circuitry) within the modem subsystem 612. In some examples, a UE may include one or more sidelink module 608.

The sidelink module 608 may be used for various aspects of the present disclosure, for example, aspects of FIGS. 1-4 and 7-12. In some aspects, the sidelink module 608 can be configured to transmit DCI(s) and other messages to a UE or other TRPs that include information associated with a sidelink configuration for the UE. In some aspects, the sidelink module 608 can be configured to perform a LBT procedure on an unlicensed carrier in association with a sidelink configuration for the UE.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., broadcast channels, DL data blocks, CC configurations, PDSCH, PDCCH, DCI, MCS, TPC, CSI-RS, ZP CSI-RS trigger, SPS configuration, SPS PDSCH, MAC-CE, group ACK codebook, dynamic grant (DG) configuration, configured grant (CG) configuration, DG PDCCH, reference signal, SIB, RRC messages, MAC-CE, sidelink configurations, CP configurations, CAPC configurations, LBT procedures, TBs) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610.

The transceiver 610 may provide the demodulated and decoded data (e.g., PUCCH, PUSCH, UCI, ACK/NACK, group ACK/NACK, CG uplink transmissions, channel report, SRS, TBs) to the sidelink module 608 for processing. The antennas 616 may include multiple antennas of similar or different designs in order to sustain multiple transmission links.

In an example, the transceiver 610 is configured to transmit, to a UE and other TRPs, DCI(s) and other messages (e.g., RRC, SIB, MAC-CE) regarding a sidelink configuration, and perform a LBT procedure on an unlicensed carrier, for example, by coordinating with the sidelink module 608.

In an aspect, the BS 600 can include multiple transceivers 610 implementing different RATs (e.g., NR and LTE). In an aspect, the BS 600 can include a single transceiver 610 implementing multiple RATs (e.g., NR and LTE). In an aspect, the transceiver 610 can include various components, where different combinations of components can implement different RATs.

Figure 7:
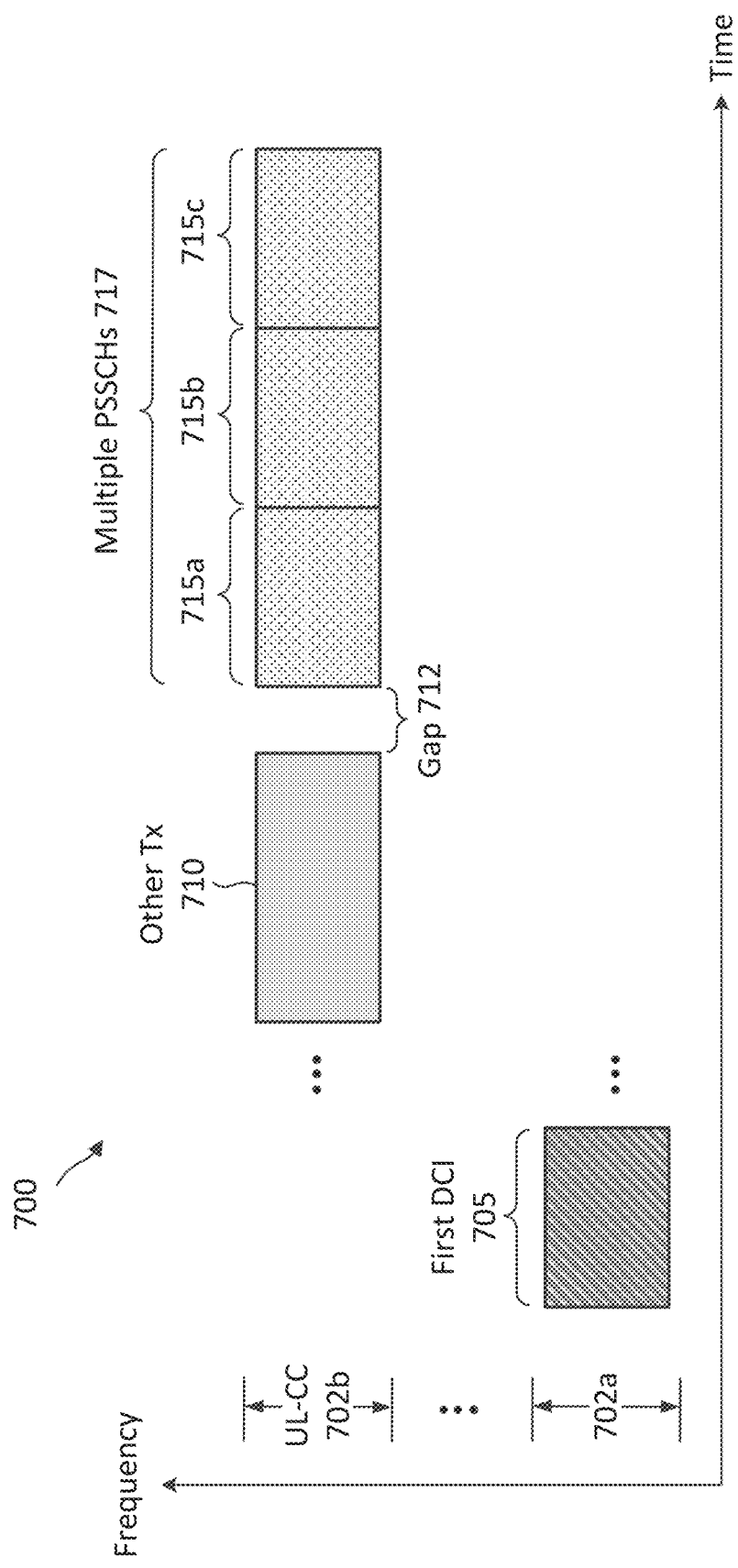
FIG. 7 illustrates a sidelink communication scheme according to some aspects of the present disclosure.

FIG. 7 illustrates a sidelink communication scheme according to some aspects of the present disclosure. The functionality of scheme 700 can be executed by a computing device (e.g., a processor, processing circuit, and/or other suitable component) of a wireless communication device or other suitable means. In some aspects, a wireless communication device such as the UE 115 or UE 500 may utilize one or more components, such as the processor 502, the memory 404, the sidelink module 508, the transceiver 510, the modem 512, and the one or more antennas 516, to execute the steps of scheme 700. Further, a wireless communication device such as the base station (BS) 105 or BS 600 may utilize one or more components, such as the processor 602, the memory 604, the sidelink module 608, the transceiver 610, the modem 612, and the one or more antennas 616, to execute the steps of scheme 700. The scheme 700 may employ similar mechanisms as described in FIGS. 1-6 and 8-12. In FIG. 7, the x-axis represents time in some arbitrary units, and the y-axis represents frequency in some arbitrary units.

As illustrated in FIG. 7, a communication scheme may include configuring sidelink communications in an unlicensed component carrier (UL-CC) 702b. In some aspects, a first DCI 705 is transmitted from a BS to a UE in a CC 702a. In some aspects, CC 702a may be a licensed carrier or an unlicensed carrier. In some aspects, CC 702a may be the same unlicensed carrier as UL-CC 702b. In some aspects, the network or BS may configure the UE with multiple sidelink transmission opportunities 715a, 715b, and 715c in UL-CC 702b based on sidelink configuration information or parameters included in the first DCI 705. In some aspects, first DCI 705 may be associated with an enhanced type 3-0 DCI. In some aspects, the carrier 702a is a licensed carrier. In some aspects, the UE and BS may determine a start time of the sidelink transmission opportunities 715a, 715b, and 715c based on first DCI 705.

In some aspects, the multiple sidelink transmission opportunities 715a, 715b, and 715c may occur following some other transmission 710 on the UL-CC 702b. In some aspects, each of the multiple sidelink transmission opportunities 715a, 715b, and 715c may be associated with a type-1 listen-before-talk (LBT) procedure. In some aspects, the UE may transmit TBs in one or more PSSCHs 717 upon a successful type-1 LBT procedure. In some aspects, the PSSCHs associated with the sidelink transmission opportunities 715a, 715b, and 715c may be on the order of one or more slot(s), one or more subframe(s), one or more frame(s), or may have arbitrary units of time.

In some aspects, the UE may successfully perform a LBT procedure within or after a gap 712 of a prior other transmission 710. In some aspects, in a scenario where the other transmission 710 may overlap in time with the sidelink transmission opportunity 715a (not shown), the UE may perform an unsuccessful type-1 LBT procedure and thus not transmit data on the PSSCH of transmission opportunity 715a. In some aspects, after an unsuccessful type-1 LBT procedure in association with transmission opportunity 715a, the UE may subsequently perform a successful type-1 LBT procedure and start transmitting TBs in the PSSCHs of 715b and 715c.

In some aspects, the UE can use a CP extension to book or reserve the shared unlicensed carrier UL-CC 702b for a channel occupancy time (COT). In some aspects, a UE may book UL-CC 702b for a COT and transmit multiple TBs in the multiple PSSCHs 717 without interference or frequency band contamination by other devices. In some aspects, the CP extension configuration is based on the first DCI 705. In some aspects, the first sidelink transmission opportunity is associated with a channel access priority class (CAPC) configuration based on the first DCI. In some aspects, the first DCI 705 may omit information associated with a CP extension configuration and/or CAPC configuration, and the UE may determine or select which CP extension to use. In some aspects, the network or BS may configure various CP extensions for the UE to select based on layer-3 information. In some aspects, each or both of the CP extension configuration and the CAPC configuration is based on a RRC message and/or SIB. In some aspects, different CP extensions may be associated with different priorities for PSSCH traffic on UL-CC 702b. In some aspects, a CP extension associated with higher-priority traffic allows the UE to occupy UL-CC 702b early or prior in time compared to the start time of transmission opportunity 715a (e.g., within gap 712). In some aspects, a CP extension associated with higher-priority traffic is associated with an early COT starting point relative to the start time of transmission opportunity 715a. In some aspects, a CP extension associated with lower-priority traffic is associated with a late COT starting point relative to the start time of transmission opportunity 715a.

In some aspects, the UE may use the multiple sidelink transmission opportunities 715a, 715b, and 715c for transmitting multiple contiguous transport blocks (TBs). In some aspects, the network or BS may configure contiguous and/or non-contiguous sidelink transmission opportunities in UL-CC 702b. In some aspects, each of the multiple sidelink transmission opportunities 715a, 715b, and 715c corresponds to a physical sidelink shared channel (PSSCH) for transmitting a TB. In some aspects, each of the multiple PSSCHs 717 may be configured for transmitting a different TB with new data in each TB. In some aspects, each of the multiple PSSCHs 717 may be associated with a different or the same hybrid automatic repeat request process identifier (HARQ process ID), new data indicator (NDI), and/or redundancy version (RV). In some aspects, some or all of the multiple PSSCHs 717 may be configured for repeatedly transmitting the same TB and/or for retransmitting a TB.

Figure 8:
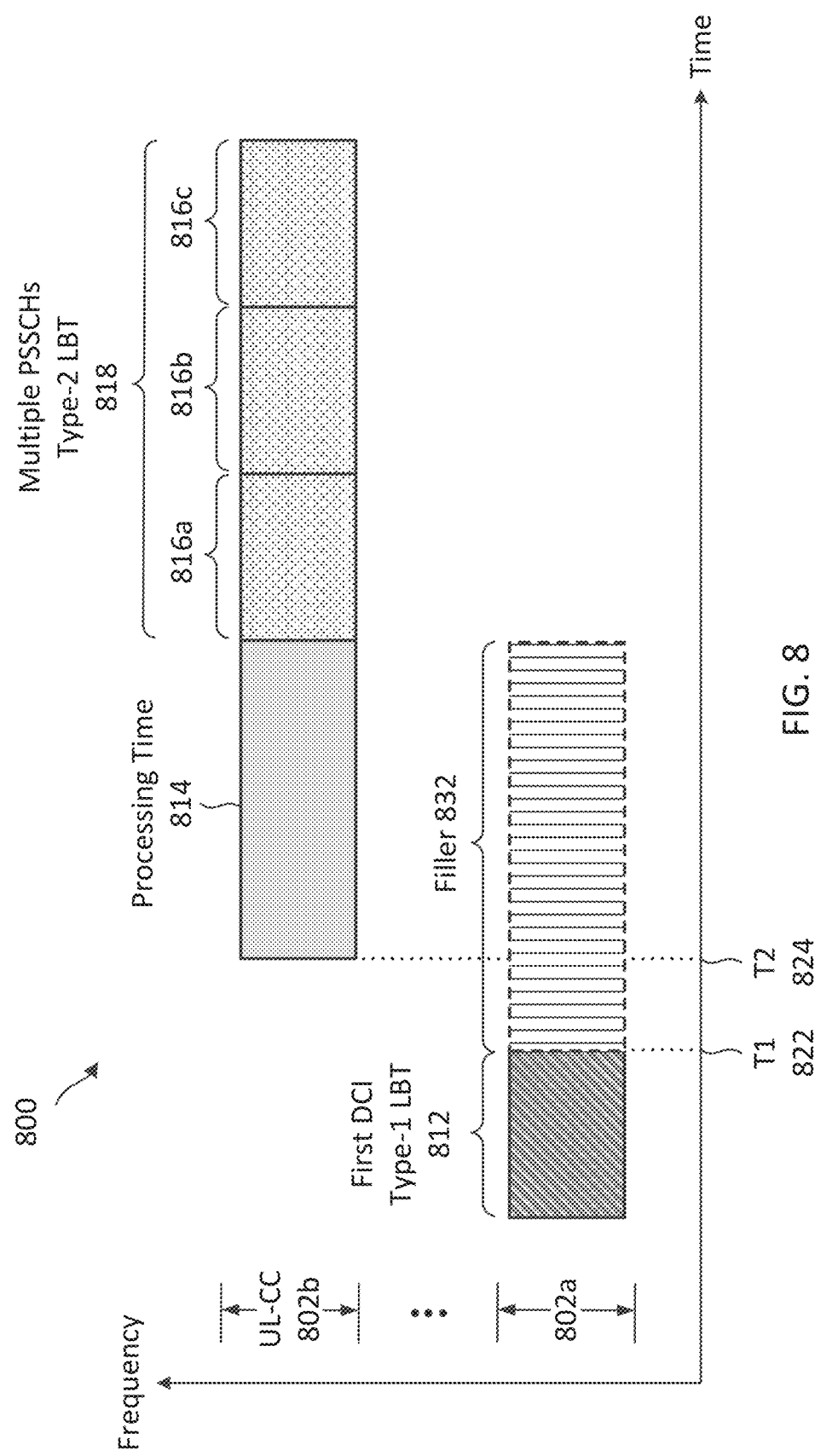
FIG. 8 illustrates a sidelink communication scheme according to some aspects of the present disclosure.

FIG. 8 illustrates a sidelink communication scheme according to some aspects of the present disclosure. The functionality of scheme 800 can be executed by a computing device (e.g., a processor, processing circuit, and/or other suitable component) of a wireless communication device or other suitable means. In some aspects, a wireless communication device such as the UE 115 or UE 500 may utilize one or more components, such as the processor 502, the memory 404, the sidelink module 508, the transceiver 510, the modem 512, and the one or more antennas 516, to execute the steps of scheme 800. Further, a wireless communication device such as the base station (BS) 105 or BS 600 may utilize one or more components, such as the processor 602, the memory 604, the sidelink module 608, the transceiver 610, the modem 612, and the one or more antennas 616, to execute the steps of scheme 800. The scheme 800 may employ similar mechanisms as described in FIGS. 1-7 and 9-12. In FIG. 8, the x-axis represents time in some arbitrary units, and the y-axis represents frequency in some arbitrary units.

As illustrated in FIG. 8, a network or BS may configure direct BS-to-UE channel occupancy time (COT) sharing of unlicensed carrier UL-CC 802b. In some aspects, the UE may monitor for a first DCI 812 on a CC 802a. In some aspects, CC 802a may be an unlicensed carrier, such as the same or a different unlicensed carrier as UL-CC 802b. In some aspects, the UE may monitor for the first DCI 812 in a UE specific search space for the Uu interface. In some aspects, the BS may transmit to the UE, upon a successful type-1 LBT procedure, the first DCI 812 on an unlicensed carrier 802a. In some aspects, the network or BS may configure multiple sidelink transmission opportunities 816a, 816b, and 816c. In some aspects, the BS and/or UE may determine the start time of one or more of the multiple sidelink transmission opportunities 816a, 816b, and 816c based on the first DCI 812. In some aspects the first DCI 812 is an enhanced type 3-0 DCI. In some aspects, the first DCI 812 is associated with a type 2-0 DCI informing the UE to replace a previously scheduled type-1 LBT sidelink transmission opportunity(ies) with one or more of the type-2 LBT sidelink transmission opportunities 816a, 816b, and 816c. As discussed above with respect to FIG. 7, the UE may use each of the multiple PSSCHs 818 for transmitting different TBs, where each TB may be associated with a different HARQ process ID, NDI, and/or RV.

In some aspects, after a successful type-1 LBT procedure, the BS may transmit first DCI 812 to the UE and then transmit a filler transmission 832 in order to occupy the unlicensed band 802a. In some aspects, in the scenario where CCs 802a and 802b correspond to the same unlicensed frequency band, the filler transmission 832 may occupy the UL-CC 802b to prevent other devices (e.g., other BSs, UEs, or WiFi devices) from successfully performing a LBT procedure and begin transmitting on UL-802b during and/or after a processing time 814. In some aspects, the processing time 814 is associated with the time for the UE to receive and process first DCI 812 and prepare TBs for transmission on PSSCHs 818. In some aspects, the network or BS will configure the gap between the time the UE completes reception of the first DCI 812 and the beginning of the first sidelink transmission opportunity 816a (e.g., a duration denoted as $T_{gap}$) to be no smaller than the UE processing time 814. In some aspects, the processing time 814 is on the order of one or more slots for a sub-carrier spacing of 15 kHz or 30 kHz for the eMBB device category.

In some aspects, the UE may transmit TBs in one or more of the multiple sidelink transmission opportunities 816a, 816b, and 816c upon a successful type-2 LBT procedure. In some aspects, the BS may omit transmitting the filler transmission 832 in the direct COT sharing scheme 800. In some aspects, the ending time T1 822 of the first DCI 812 transmission may be at approximately the same time or prior in time compared to the beginning time T2 824, at which the UE has received and begins processing the first DCI 812. In some aspects, the time difference between T1 822 and T2 824 may vary, for instance, depending on the transmission medium quality of UL-CCs 802a and/or 802b and/or the UE's reception and processing capabilities. In some aspects, the first DCI 812 may be associated with multiple rich-context type 3-0 DCIs, lasting two or three or more OFDM symbols (e.g., a duration denoted as $T_{DCI3}$). In the scenario where $T_{gap} T_{DCI3}$ is longer than a slot, the filler transmission 832 may be one slot or longer.

FIGS. 9A-9D illustrate sidelink communication schemes according to some aspects of the present disclosure. The functionality of schemes 900, 910, 920, and 930 can be executed by a computing device (e.g., a processor, processing circuit, and/or other suitable component) of a wireless communication device or other suitable means. In some aspects, a wireless communication device such as the UE 115 or UE 500 may utilize one or more components, such as the processor 502, the memory 404, the sidelink module 508, the transceiver 510, the modem 512, and the one or more antennas 516, to execute the steps of schemes 900, 910, 920, and 930. Further, a wireless communication device such as the base station (BS) 105 or BS 600 may utilize one or more components, such as the processor 602, the memory 604, the sidelink module 608, the transceiver 610, the modem 612, and the one or more antennas 616, to execute the steps of schemes 900, 910, 920, and 930. The schemes 900, 910, 920, and 930 may employ similar mechanisms as described in FIGS. 1-8 and 10-12. In FIGS. 9A-9D, the x-axis represents time in some arbitrary units.

Figures 9A, 9B:
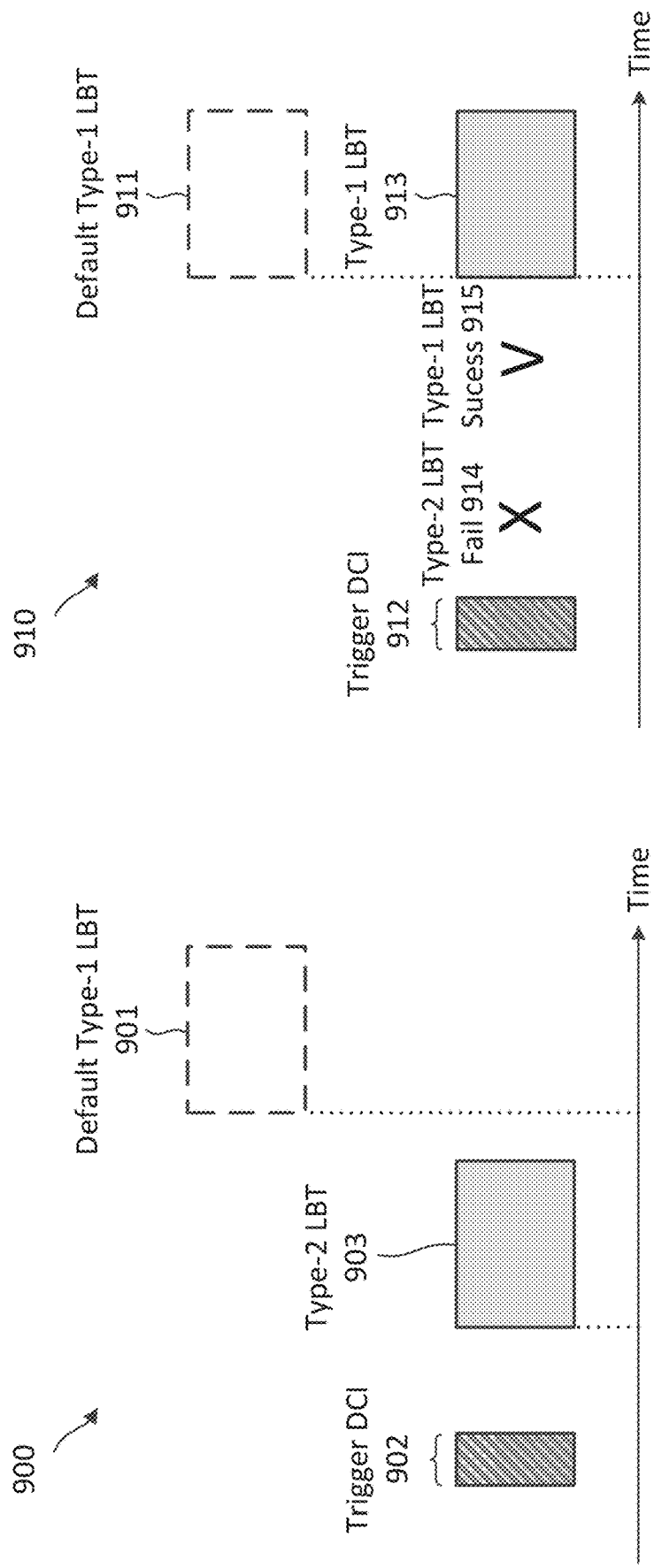

As illustrated in FIG. 9A (and FIGS. 9B-9D), the network or BS may configure a first default sidelink transmission opportunity 901 associated with a type-1 LBT procedure (e.g., according to scheme 700 of FIG. 7 as discussed above) as well as a second sidelink transmission opportunity 903 based on a trigger DCI 902. In some aspects, the network or BS may also configure a sidelink transmission opportunity associated with a type-2 LBT procedure (e.g., according to scheme 800 of FIG. 8 as discussed above) within schemes 900, 910, 920, or 930 (not shown). In some aspects, each of the default type-1 LBT transmission opportunity 901 and the type-2 LBT transmission opportunity 903 may be comprised of one or more transmission opportunities for transmitting multiple TBs in multiple PSSCHs (e.g., as discussed above at FIG. 7 and below at FIG. 10). In some aspects, after the BS transmits a first DCI (not shown) to the UE for configuring the default type-1 LBT transmission opportunity 901, the BS (e.g., or another TRP such as a proxy UE) may transmit the trigger DCI 902 for configuring the type-2 LBT transmission opportunity 903. In some aspects, the first DCI (not shown) for configuring the default type-1 LBT transmission opportunity 901 may indicate the potential presence of a trigger DCI 902. In some aspects, the UE may receive the trigger DCI 902 by monitoring a common search space in an unlicensed carrier.

In some aspects, the first DCI (not shown) for configuring the default type-1 LBT transmission opportunity 901 may indicate the format of trigger DCI 902, the time-frequency domain window in which trigger DCI 902 may be transmitted, and the type-2 LBT configuration associated with the sidelink transmission opportunity 903. In some aspects, the UE may book or check out the unlicensed carrier for COTs in different points in time using both or either the default type-1 LBT sidelink transmission opportunity 901 and/or the type-2 LBT sidelink transmission opportunity 903. In some aspects, the UE may begin preparing TBs upon receiving the first DCI (not shown) for configuring the default type-1 LBT transmission opportunity 901. In some aspects, the TBs may be already prepared by the time the UE receives the trigger DCI 902. In the scenario where the UE has prepared TBs for sidelink transmission by the time the UE receives trigger DCI 902, the UE may begin sidelink transmission(s) in the PSSCHs associated with transmission opportunity 903 with a reduced processing time (e.g., compared to the processing time 814 of scheme 800 in FIG. 8). In some aspects, the first DCI (not shown) for configuring the default type-1 LBT transmission opportunity 901 may omit information configuration information regarding trigger DCI 902. In some aspects, the trigger DCI 902 may correspond to a static or pre-configured trigger DCI. In some aspects, a static or preconfigured trigger DCI 902 may be configured in a SIB, RRC message, or MAC-CE. In some aspects, the network or BS may configure multiple static or preconfigured trigger DCIs 902, where each preconfigured trigger may be configured in different time and/or frequency resource allocations in licensed and/or unlicensed carriers.

As further illustrated in FIG. 9A, the trigger DCI 902 may be an early trigger that is received by the UE prior to the beginning time of the default transmission opportunity 901. In the scenario where the trigger DCI 902 is an early trigger, the UE may check out the unlicensed carrier for a COT prior to the beginning of the COT associated with the default transmission opportunity 901, subject to a successful type-2 LBT procedure.

As illustrated in FIG. 9B, the trigger DCI 912 may be an early trigger that is received by the UE prior to the beginning time of the default transmission opportunity 911. In the scenario where the trigger DCI 912 is an early trigger, the UE may unsuccessfully perform a type-2 LBT procedure for checking out the unlicensed carrier based on the trigger DCI 912. In the scenario of an unsuccessful type-2 LBT procedure resulting in type-2 LBT fail 914, the UE may fall back to the default type-1 LBT transmission opportunity 911. In the scenario where the UE falls back to the default type-1 LBT transmission opportunity 911, the UE may transmit TBs on PSSCHs associated with transmission opportunity 913 (e.g., at the same time as default type-1 LBT transmission opportunity 911) subject to a successful type-1 LBT procedure 915.

As illustrated in FIG. 9C, the trigger DCI 922 may be a late trigger that is received by the UE after the beginning time of the default transmission opportunity 921. In the scenario where the trigger DCI 922 is a late trigger, the UE may check out the unlicensed carrier with a COT beginning after the beginning time of the default transmission opportunity 921. In some aspects, the type-1 LBT procedure associated with transmission opportunity 921 may fail and the UE may not have begun transmitting TBs on PSSCHs by the time it receives the late trigger DCI 922. In some aspects, the type-2 LBT transmission opportunity 923 based on trigger DCI 922 may end at a time later than the ending time of default type-1 LBT transmission opportunity 921.

As illustrated in FIG. 9D, the trigger DCI 932 may be a late trigger that is received by the UE after to the beginning time of the default transmission opportunity 931. In the scenario where the trigger DCI 932 is a late trigger, the UE may check out the unlicensed carrier with a COT beginning after the beginning time of the default transmission opportunity 931. In some aspects, the type-1 LBT procedure associated with transmission opportunity 931 may fail and the UE may not have begun transmitting TBs on PSSCHs by the time it receives the late trigger DCI 932. In some aspects, the type-2 LBT transmission opportunity 933 based on trigger DCI 932 may end at the same time as the ending time of default type-1 LBT transmission opportunity 931. In the scenario where the transmission opportunity 933 is based on the late trigger DCI 932 and ends at the same time as the ending time of default type-1 LBT transmission opportunity 931, the transmission opportunity 933 may include fewer PSSCHs (e.g., few time slots for transmitting TBs) compared to the default transmission opportunity 931.

In some aspects, the UE may be configured according to the late trigger scheme 920 of FIG. 9C or the late trigger scenario 930 of FIG. 9D based on a layer-3 configuration, a RRC message, or SIB(s). In some aspects, the UE may be configured according to the late trigger scheme 920 of FIG. 9C or the late trigger scenario 930 of FIG. 9D based on a first DCI (not shown) associated with configuring, respectively, default type-1 LBT transmission opportunity 921 or default type-1 LBT transmission opportunity 931.

In some aspects, the trigger DCI 902, 912, 922, or 932 of FIGS. 9A-9D may be transmitted by the BS as a simplified type 2-0 DCI in a Uu interface common search space on a licensed or unlicensed carrier. In some aspects, the common search space associated with trigger DCI 902, 912, 922, or 932 may be configured in an enhanced SIB (SIBX). In some aspects, the trigger DCI 902, 912, 922, or 932 may be transmitted by the BS or by another TRP. In some aspects, the trigger DCI 902, 912, 922, or 932 may be transmitted by a proxy UE. In some aspects, in the scenario where the trigger DCI 902, 912, 922, or 932 is transmitted by a proxy UE, the proxy UE may transmit the trigger DCI on a pre-configured PSSCH upon successfully performing a type-1 LBT procedure. In some aspects, the proxy UE may be configured by the BS via layer-3 signaling. In some aspects, the proxy UE may be activated and deactivated by the BS via layer-1 signaling. In some aspects, the trigger DCI 902, 912, 922, or 932 may be transmitted within time and frequency resource allocation (e.g., a PSSCH) specified by the first DCI (not shown) that is used to configure the default transmission opportunities 903, 913, 923, or 933. In some aspects, the trigger DCI 902, 912, 922, or 932 may have similar contents as a type 2-0 DCI and may be carried over a back-loaded SCI. In some aspects, the trigger DCI 902, 912, 922, or 932 may be transmitted in a PSSCH with filler transmissions (e.g., filler transmission 832) transmitted before and/or after a back-loaded SCI carrying the trigger DCI.

Figure 10:
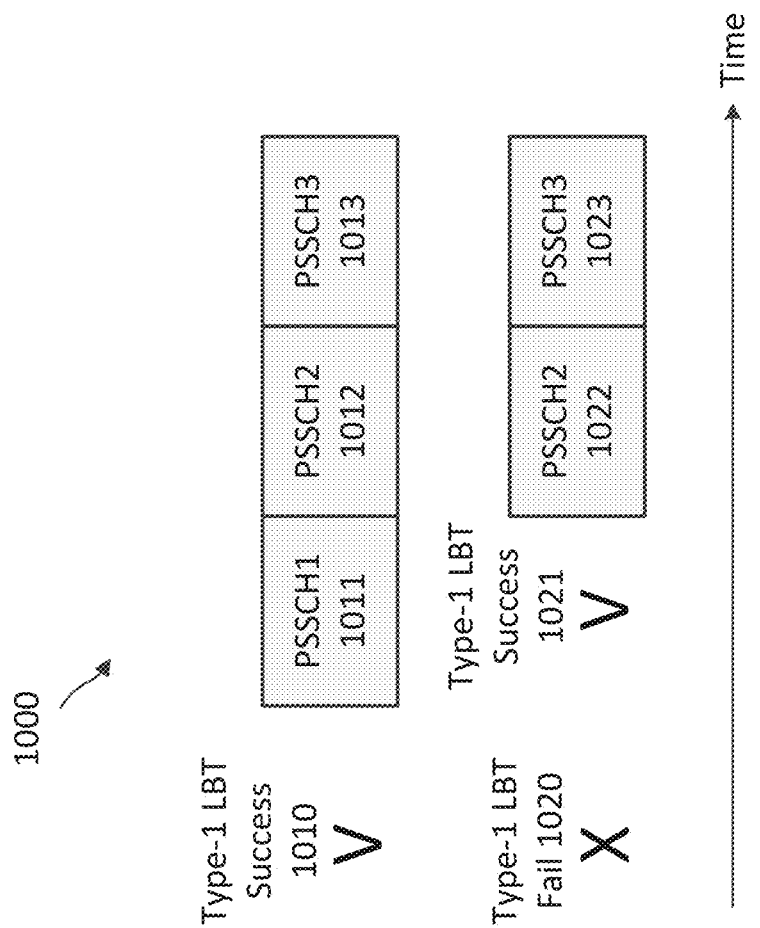
FIG. 10 illustrates a sidelink communication scheme according to some aspects of the present disclosure.

FIG. 10 illustrates a sidelink communication scheme according to some aspects of the present disclosure. The functionality of scheme 1000 can be executed by a computing device (e.g., a processor, processing circuit, and/or other suitable component) of a wireless communication device or other suitable means. In some aspects, a wireless communication device such as the UE 115 or UE 500 may utilize one or more components, such as the processor 502, the memory 404, the sidelink module 508, the transceiver 510, the modem 512, and the one or more antennas 516, to execute the steps of scheme 1000. Further, a wireless communication device such as the base station (BS) 105 or BS 600 may utilize one or more components, such as the processor 602, the memory 604, the sidelink module 608, the transceiver 610, the modem 612, and the one or more antennas 616, to execute the steps of scheme 1000. The scheme 1000 may employ similar mechanisms as described in FIGS. 1-9 and 11-12. In FIG. 10, the x-axis represents time in some arbitrary units.

As illustrated in FIG. 10, the UE may be configured with multiple contiguous transmission opportunities for transmitting TBs in multiple contiguous PSSCH1 1011, PSCCH2 1012, and PSCCH3 1013. In some aspects, after successfully performing a type-1 LBT procedure 1010 associated with PSCCH1 1011, the UE may begin transmitting TBs in PSSCH1 1011, PSCCH2 1012, and PSCCH3 1013. In some aspects, after unsuccessfully performing a type-1 LBT procedure 1020, the UE may subsequently successfully perform a type-1 LBT procedure 1021 and may begin transmitting TBs in PSCCH2 1022 and PSSCH2 1023. In some aspects, the multiple contiguous PSSCHs 1011, 1012, 1013 (or 1022, and 1023) of FIG. 10 may be configured according to the type-1 LBT sidelink transmission configuration schemes of FIGS. 7 and 9A-9D. In some aspects, the multiple contiguous PSSCHs 1011, 1012, 1013, 1022, and 1023 of FIG. 10 may be configured according to the type-2 LBT sidelink transmission configuration schemes of FIGS. 8 and 9A-9D. In some aspects, the type-1 LBT successes 1010 and 1021 and fail 1020 may instead be associated with type-2 LBT procedures.

Figure 11:
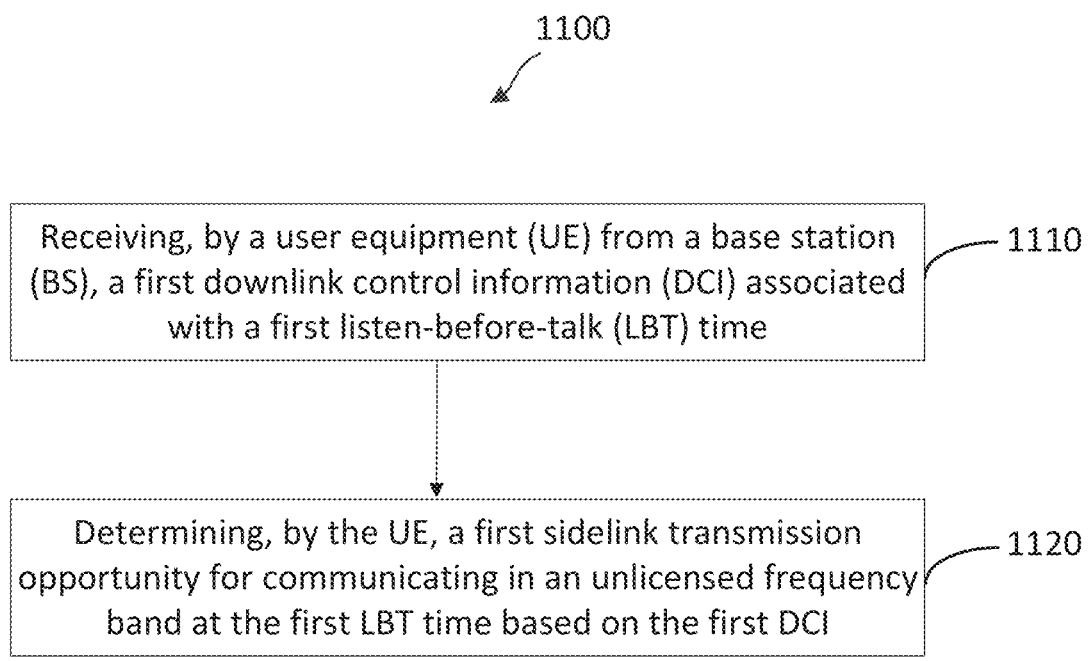
FIG. 11 is a flow diagram of a communication method according to some aspects of the present disclosure.

FIG. 11 illustrates a flow diagram of a communication method 1100 according to some aspects of the present disclosure. The functionality of method 1100 can be executed by a computing device (e.g., a processor, processing circuit, and/or other suitable component) of a wireless communication device or other suitable means. In some aspects, a wireless communication device such as the UE 115, UE 215, or UE 500 may utilize one or more components, such as the processor 502, the memory 404, the sidelink module 508, the transceiver 510, the modem 512, and the one or more antennas 516, to execute the steps of method 1100. The method 1100 may employ similar mechanisms as described in FIGS. 1-10 and 12.

As illustrated in FIG. 11, step 1110 includes receiving, by the UE from a base station (BS), a first downlink control information (DCI) associated with a first listen-before-talk (LBT) time. In some aspects, each of UE 115, UE 215, or UE 500 may perform the receiving step 1110 using one or more of a processor, memory, a transceiver, and/or software, including, for example, the hardware and software components illustrated in FIGS. 1-2 and 5. Various algorithms may be used by the UE to perform this step, including, for example, the sidelink communication algorithms described above with respect to FIGS. 1-4 and 7-10.

Step 1120 further includes determining, by the UE, a first sidelink transmission opportunity for communicating in an unlicensed frequency band at the first LBT time based on the first DCI. In some aspects, each of UE 115, UE 215, or UE 500 may perform the determining step 1120 using one or more of a processor, memory, and/or software, including, for example, the hardware and software components illustrated in FIGS. 1-2 and 5. Various algorithms may be used by the UE to perform this step, including, for example, the sidelink communication algorithms described above with respect to FIGS. 1-4 and 7-10.

Figure 12:
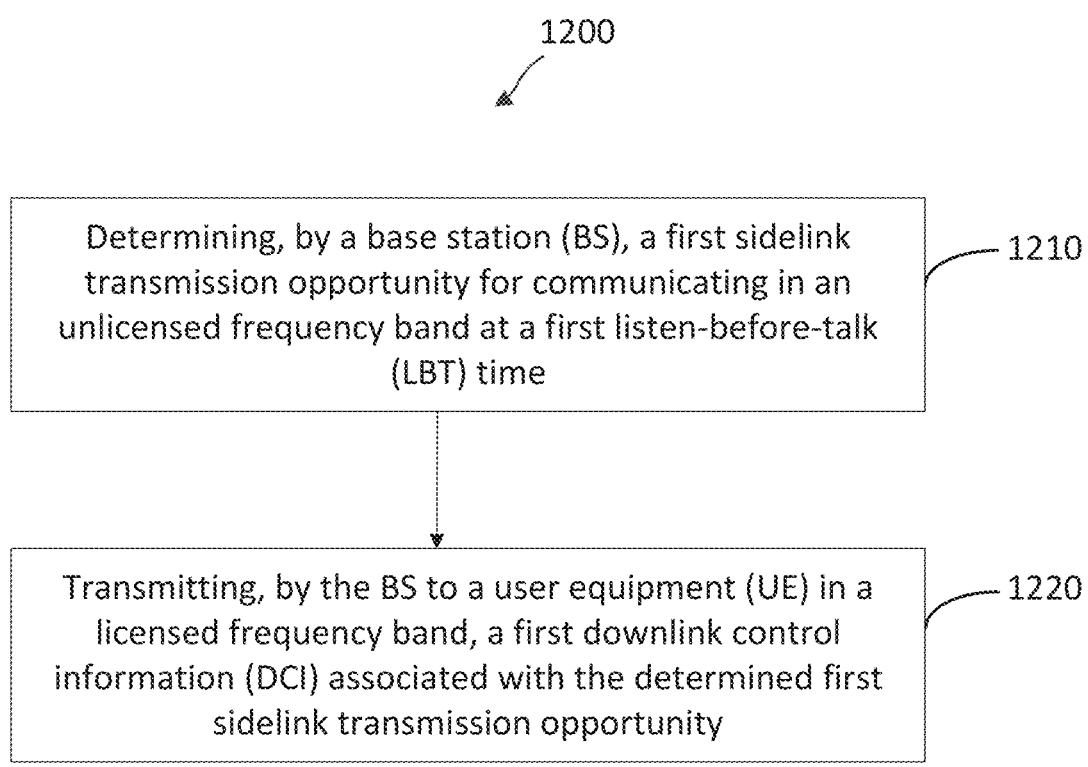
FIG. 12 is a flow diagram of a communication method according to some aspects of the present disclosure.

FIG. 12 illustrates a flow diagram of a communication method 1200 according to some aspects of the present disclosure. The functionality of method 1200 can be executed by a computing device (e.g., a processor, processing circuit, and/or other suitable component) of a wireless communication device or other suitable means. In some aspects, a wireless communication device such as the base station (BS) 105, BS 205, or BS 600 may utilize one or more components, such as the processor 602, the memory 604, the sidelink module 608, the transceiver 610, the modem 612, and the one or more antennas 616, to execute the steps of method 1200. The method 1200 may employ similar mechanisms as described in FIGS. 1-11.

As illustrated in FIG. 12, step 1210 includes determining, by a base station (BS), a first side-link transmission opportunity for communicating in an unlicensed frequency band at a first listen-before-talk (LBT) time. In some aspects, each of network 100, BS 105, or BS 600 may perform the determining step 1210 using one or more of a processor, memory, and/or software, including, for example, the hardware and software components illustrated in FIGS. 1-2 and 6. Various algorithms may be used by the BS to perform this step, including, for example, the algorithms described above with respect to FIGS. 1-4 and 7-10.

Step 1220 further includes transmitting, by the BS to a user equipment (UE) in a licensed frequency band, a first downlink control information (DCI) associated with the determined first side-link transmission opportunity. In some aspects, each of network 100, BS 105, or BS 600 may perform the transmitting step 1220 using one or more of a processor, memory, transceiver, and/or software, including, for example, the hardware and software components illustrated in FIGS. 1-2 and 6. Various algorithms may be used by the BS to perform this step, including, for example, the algorithms described above with respect to FIGS. 1-4 and 7-10.

In some instances, the second LBT trigger opportunity is associated with a time-frequency resource for detecting the second LBT trigger based on the first DCI.

In some instances, the second LBT trigger opportunity is associated with a trigger format based on the first DCI.

In some instances, the first DCI is associated with an enhanced type 3-0 DCI.

In some instances, the second LBT trigger opportunity is further associated with a pre-configured sidelink-band trigger, wherein the pre-configured sidelink-band trigger is based on one of a system information block configuration, a radio resource control (RRC) message configuration, or a media access control control element (MAC-CE) message configuration.

In some instances, the second LBT time is prior to the first LBT time, and the UE transmits the first transmission in a physical sidelink shared channel (PSSCH) at the second sidelink transmission opportunity based on the type-2 LBT procedure associated with second first sidelink transmission opportunity being successful, or the UE transmits the first transmission in a physical sidelink shared channel (PSSCH) at the first sidelink transmission opportunity based on the type-2 LBT procedure associated with the second sidelink transmission opportunity being unsuccessful.

In some instances, the first LBT time is prior to the second LBT time, an ending time of the determined second sidelink transmission opportunity is based on one of an ending time of the first sidelink transmission opportunity or an overriding ending time of the second sidelink transmission opportunity, and the ending time of the determined second sidelink transmission opportunity is based on one of the first DCI, a system information block, or a radio resource configuration (RRC) message.

In some instances, the second LBT trigger is associated with a simplified type 2-0 DCI, and the UE receives the second LBT trigger from the BS based on a common search space (CSS) configuration in the unlicensed frequency band, wherein the CSS configuration is based on an enhanced system information block.

In some instances, the UE receives the second LBT trigger in a physical sidelink shared channel (PSSCH).

In some instances, the first wireless communication device is a proxy sidelink UE, and the second LBT trigger is associated with a type-1 LBT procedure.

In some instances, the UE receives the first DCI in an unlicensed frequency band, the first DCI is associated with an enhanced type 3-0 DCI, and the first sidelink transmission opportunity is associated with a type-2 listen-before-talk (LBT) procedure.

In some instances, the BS transmits a system information block associated with a first cyclic prefix (CP) extension configuration for the first sidelink transmission opportunity, or the BS transmits a radio resource control (RRC) message associated with a second CP extension configuration for the first sidelink transmission opportunity.

In some instances, the BS transmits a system information block associated with a first channel access priority class (CAPC) configuration for the first sidelink transmission opportunity, or the BS transmits a radio resource control (RRC) message associated with a second CAPC configuration for the first sidelink transmission opportunity.

In some instances, the second LBT trigger is associated with a simplified type 2-0 DCI, and the BS transmits the second LBT trigger based on a common search space (CSS) configuration in the unlicensed frequency band, wherein the CSS configuration is based on an enhanced system information block.

In some instances, the BS transmits the second LBT trigger in a physical sidelink shared channel (PSSCH).

In some instances, the BS transmits the first DCI in an unlicensed frequency band, the first DCI is associated with an enhanced type 3-0 DCI, and the first sidelink transmission opportunity is associated with a type-2 listen-before-talk (LBT) procedure.

Further aspects of the present disclosure include a method of wireless communication performed by a first user equipment (UE). The method of wireless communication includes receiving, by the UE from a base station (BS), a first downlink control information (DCI) associated with a first listen-before-talk (LBT) time; and determining, by the UE, a first sidelink transmission opportunity for communicating in an unlicensed frequency band at the first LBT time based on the first DCI.

The method may also include one or more of the following features. For instance, the method includes where the receiving the first DCI further includes receiving the first DCI in a licensed frequency band; where the first DCI is further associated with a second LBT trigger opportunity; where the method further includes receiving, by the UE from a first wireless communication device, a second LBT trigger associated with a second LBT time based on the second LBT trigger opportunity; determining, by the UE, a second sidelink transmission opportunity for communicating in the unlicensed frequency band at the second LBT time based on the communicated second LBT trigger; and transmitting, by the UE to a second wireless communication device, in an unlicensed-band a first transmission in a physical sidelink shared channel (PSSCH) at one of the first sidelink transmission opportunity or the second sidelink transmission opportunity. The second LBT trigger opportunity is associated with a time-frequency resource for detecting the second LBT trigger based on the first DCI; where the second LBT trigger opportunity is associated with a trigger format based on the first DCI; where the first sidelink transmission opportunity is associated with a cyclic prefix (CP) extension configuration based on the first DCI; where the first sidelink transmission opportunity is associated with a channel access priority class (CAPC) configuration based on the first DCI; and where the first wireless communication device is one of the BS, a transmission-and-reception point, or a proxy sidelink UE. The second sidelink transmission opportunity is associated with a type-2 LBT procedure. The second LBT trigger opportunity is further associated with a pre-configured sidelink-band trigger; and where the pre-configured sidelink-band trigger is based on one of a system information block configuration, a radio resource control (RRC) message configuration, or a media access control control element (MAC-CE) message configuration. The method further includes determining, by the UE, a second set of one or more sidelink transmission opportunities contiguous with the determined second sidelink transmission opportunity based on the first DCI; where a second group of contiguous transmission opportunities includes each of the determined second sidelink transmission opportunity and the second set of transmission opportunities; and transmitting, by the UE to a second wireless communication device, in an unlicensed-band a second plurality of transmissions in the second group of contiguous transmission opportunities; where the second plurality of transmissions is associated with a plurality of different transport blocks (TBs); where each of the plurality of different TBs is associated with a hybrid automatic repeat request (HARQ) process identifier, a new data indicator (NDI), and a redundancy version (RV). The second LBT time is prior to the first LBT time; where the first sidelink transmission opportunity is associated with a type-1 LBT procedure; where the second sidelink transmission opportunity is associated a type-2 LBT procedure; and where the transmitting the first transmission further includes one of transmitting the first transmission in a physical sidelink shared channel (PSSCH) at the second sidelink transmission opportunity based on the type-2 LBT procedure associated with second first sidelink transmission opportunity being successful; or transmitting the first transmission in a physical sidelink shared channel (PSSCH) at the first sidelink transmission opportunity based on the type-2 LBT procedure associated with the second sidelink transmission opportunity being unsuccessful. The first LBT time is prior to the second LBT time; and where an ending time of the determined second sidelink transmission opportunity is based on one of an ending time of the first sidelink transmission opportunity or an overriding ending time of the second sidelink transmission opportunity; and where the ending time of the determined second sidelink transmission opportunity is based on one of the first DCI, a system information block, or a radio resource configuration (RRC) message. The second LBT trigger is associated with a simplified type 2-0 DCI; where the receiving the second LBT trigger further includes receiving the second LBT trigger based on a common search space (CSS) configuration in the unlicensed frequency band; where the CSS configuration is based on an enhanced system information block; and where the first wireless communication device is the BS. The receiving the second LBT trigger further includes receiving the second LBT trigger in a physical sidelink shared channel (PSSCH). The first wireless communication device is a proxy sidelink UE; and where the second LBT trigger is associated with a type-1 LBT procedure. The first DCI is associated with an enhanced type 3-0 DCI; and where the first sidelink transmission opportunity is associated with a type-1 LBT procedure. The method further includes determining, by the UE, a cyclic prefix (CP) extension configuration for the first sidelink transmission opportunity based on one of a system information block configuration or a radio resource control (RRC) message configuration. The method further includes determining, by the UE, a channel access priority class (CAPC) configuration for the first sidelink transmission opportunity based on one of a system information block configuration or a radio resource control (RRC) message configuration. The method further includes determining, by the UE, a first set of one or more sidelink transmission opportunities contiguous with the determined first sidelink transmission opportunity based on the first DCI; where a first group of contiguous transmission opportunities includes each of the determined first sidelink transmission opportunity and the first set of transmission opportunities; and transmitting, by the UE to a second wireless communication device, in an unlicensed-band a first plurality of transmissions in the first group of contiguous transmission opportunities; where the first plurality of transmissions is associated with a plurality of different transport blocks (TB s); where each of the plurality of different TBs is associated with a hybrid automatic repeat request (HARQ) process identifier, a new data indicator (NDI), and a redundancy version (RV); and where each of the first set of sidelink transmission opportunities is associated with a type-1 LBT procedure. The receiving the first DCI further includes receiving the first DCI in an unlicensed frequency band; where the first DCI is associated with an enhanced type 3-0 DCI; and where the first sidelink transmission opportunity is associated with a type-2 listen-before-talk (LBT) procedure.

Further aspects of the present disclosure include a method of wireless communication performed by a base station (BS). The method of wireless communication includes determining, by the BS, a first sidelink transmission opportunity for communicating in an unlicensed frequency band at a first listen-before-talk (LBT) time. The method of wireless communication also includes transmitting, by the BS to a user equipment (UE) in a licensed frequency band, a first downlink control information (DCI) associated with the determined first sidelink transmission opportunity.

The method may also include one or more of the following features. For instance, the method includes where the transmitting the first DCI further includes transmitting the first DCI in a licensed frequency band; where the first DCI is further associated with a second LBT trigger opportunity; where the method further includes transmitting, by the BS to the UE, a second LBT trigger associated with a second sidelink transmission opportunity for communicating in the unlicensed frequency band at a second LBT time based on the second LBT trigger opportunity. The second LBT trigger opportunity is associated with a time-frequency resource for transmitting the second LBT trigger based on the first DCI; where the second LBT trigger opportunity is associated with a trigger format based on the first DCI; where the first sidelink transmission opportunity is associated with a channel access priority class (CAPC) configuration based on the first DCI; and where the first sidelink transmission opportunity is associated with a cyclic prefix (CP) extension configuration based on the first DCI. The second sidelink transmission opportunity is associated with a type-2 LBT procedure. The second LBT trigger opportunity is further associated with a pre-configured sidelink-band trigger; and where the pre-configured sidelink-band trigger is based on one of a system information block configuration, a radio resource control (RRC) message configuration, or a media access control control element (MAC-CE) message configuration. The first DCI is associated with a second set of one or more sidelink transmission opportunities contiguous with the determined second sidelink transmission opportunity; where a second group of contiguous transmission opportunities includes each of the determined second sidelink transmission opportunity and the second set of transmission opportunities; where the second group of contiguous transmission opportunities is associated with a plurality of different transport blocks (TBs); and where each of the plurality of different TBs is associated with a hybrid automatic repeat request (HARQ) process identifier, a new data indicator (NDI), and a redundancy version (RV). The second LBT time is prior to the first LBT time; where the first sidelink transmission opportunity is associated with a type-1 LBT procedure; where the second sidelink transmission opportunity is associated a type-2 LBT procedure. The first LBT time is prior to the second LBT time; and where an ending time of the determined second sidelink transmission opportunity is based on one of an ending time of the first sidelink transmission opportunity or an overriding ending time of the second sidelink transmission opportunity; and where the ending time of the determined second sidelink transmission opportunity is based on one of the first DCI, a system information block, or a radio resource configuration (RRC) message. The second LBT trigger is associated with a simplified type 2-0 DCI; where the transmitting the second LBT trigger further includes transmitting the second LBT trigger based on a common search space (CSS) configuration in the unlicensed frequency band; where the CSS configuration is based on an enhanced system information block. The transmitting the second LBT trigger further includes transmitting the second LBT trigger in a physical sidelink shared channel (PSSCH). The first DCI is associated with an enhanced type 3-0 DCI; and where the first sidelink transmission opportunity is associated with a type-1 LBT procedure. The method further includes one of transmitting, by the BS, a system information block associated with a first cyclic prefix (CP) extension configuration for the first sidelink transmission opportunity; or transmitting, by the BS, a radio resource control (RRC) message associated with a second CP extension configuration for the first sidelink transmission opportunity. The method further includes transmitting, by the BS, a system information block associated with a first channel access priority class (CAPC) configuration for the first sidelink transmission opportunity; or transmitting, by the BS, a radio resource control (RRC) message associated with a second CAPC configuration for the first sidelink transmission opportunity. The first DCI is associated with a first set of one or more sidelink transmission opportunities contiguous with the determined first sidelink transmission opportunity; where each of the first set of sidelink transmission opportunities is associated with a type-1 LBT procedure; where a first group of contiguous transmission opportunities includes each of the determined first sidelink transmission opportunity and the first set of transmission opportunities; where the first group of contiguous transmission opportunities is associated with a plurality of different transport blocks (TBs); and where each of the plurality of different TBs is associated with a hybrid automatic repeat request (HARQ) process identifier, a new data indicator (NDI), and a redundancy version (RV). The transmitting the first DCI further includes transmitting the first DCI in an unlicensed frequency band; where the first DCI is associated with an enhanced type 3-0 DCI; and where the first sidelink transmission opportunity is associated with a type-2 listen-before-talk (LBT) procedure.

Further aspects of the present disclosure include a first user equipment (UE) including a transceiver configured to receive, from a base station (BS), a first downlink control information (DCI) associated with a first listen-before-talk (LBT) time; and a processor configured to determine a first sidelink transmission opportunity for communicating in an unlicensed frequency band at the first LBT time based on the first DCI.

The first UE may also include one or more of the following features. For instance, The first UE includes where the transceiver is further configured to receive the first DCI in a licensed frequency band, where the first DCI is further associated with a second LBT trigger opportunity; and receive, from a first wireless communication device, a second LBT trigger associated with a second LBT time based on the second LBT trigger opportunity; where the processor is further configured to determine a second sidelink transmission opportunity for communicating in the unlicensed frequency band at the second LBT time based on the communicated second LBT trigger; and where the transceiver is further configured to transmit, to a second wireless communication device, in an unlicensed-band a first transmission in a physical sidelink shared channel (PSSCH) at one of the first sidelink transmission opportunity or the second sidelink transmission opportunity. The second LBT trigger opportunity is associated with a time-frequency resource for detecting the second LBT trigger based on the first DCI; where the second LBT trigger opportunity is associated with a trigger format based on the first DCI; where the first sidelink transmission opportunity is associated with a cyclic prefix (CP) extension configuration based on the first DCI; where the first sidelink transmission opportunity is associated with a channel access priority class (CAPC) configuration based on the first DCI; and where the first wireless communication device is one of the BS, a transmission-and-reception point, or a proxy sidelink UE. The second sidelink transmission opportunity is associated with a type-2 LBT procedure. The second LBT trigger opportunity is further associated with a pre-configured sidelink-band trigger; and where the pre-configured sidelink-band trigger is based on one of a system information block configuration, a radio resource control (RRC) message configuration, or a media access control control element (MAC-CE) message configuration. The processor is further configured to determine a second set of one or more sidelink transmission opportunities contiguous with the determined second sidelink transmission opportunity based on the first DCI; where a second group of contiguous transmission opportunities includes each of the determined second sidelink transmission opportunity and the second set of transmission opportunities; where the transceiver is further configured to transmit, to a second wireless communication device, in an unlicensed-band a second plurality of transmissions in the second group of contiguous transmission opportunities; where the second plurality of transmissions is associated with a plurality of different transport blocks (TBs); and where each of the plurality of different TBs is associated with a hybrid automatic repeat request (HARQ) process identifier, a new data indicator (NDI), and a redundancy version (RV). The second LBT time is prior to the first LBT time; where the first sidelink transmission opportunity is associated with a type-1 LBT procedure; where the second sidelink transmission opportunity is associated a type-2 LBT procedure; and where the transceiver is further configured to either transmit the first transmission in a physical sidelink shared channel (PSSCH) at the second sidelink transmission opportunity based on the type-2 LBT procedure associated with second first sidelink transmission opportunity being successful; or transmit the first transmission in a physical sidelink shared channel (PSSCH) at the first sidelink transmission opportunity based on the type-2 LBT procedure associated with the second sidelink transmission opportunity being unsuccessful. The first LBT time is prior to the second LBT time; where an ending time of the determined second sidelink transmission opportunity is based on one of an ending time of the first sidelink transmission opportunity or an overriding ending time of the second sidelink transmission opportunity; and where the ending time of the determined second sidelink transmission opportunity is based on one of the first DCI, a system information block, or a radio resource configuration (RRC) message. The second LBT trigger is associated with a simplified type 2-0 DCI; where the transceiver is further configured to receive the second LBT trigger based on a common search space (CSS) configuration in the unlicensed frequency band; where the CSS configuration is based on an enhanced system information block; and where the first wireless communication device is the BS. The transceiver is further configured to receive the second LBT trigger in a physical sidelink shared channel (PSSCH). The first wireless communication device is a proxy sidelink UE; and where the second LBT trigger is associated with a type-1 LBT procedure. The first DCI is associated with an enhanced type 3-0 DCI; and where the first sidelink transmission opportunity is associated with a type-1 LBT procedure. The processor is further configured to determine a cyclic prefix (CP) extension configuration for the first sidelink transmission opportunity based on one of a system information block configuration or a radio resource control (RRC) message configuration. The processor is further configured to determine a channel access priority class (CAPC) configuration for the first sidelink transmission opportunity based on one of a system information block configuration or a radio resource control (RRC) message configuration. The processor is further configured to determine a first set of one or more sidelink transmission opportunities contiguous with the determined first sidelink transmission opportunity based on the first DCI, where a first group of contiguous transmission opportunities includes each of the determined first sidelink transmission opportunity and the first set of transmission opportunities; and where the transceiver is further configured to transmit, to a second wireless communication device, in an unlicensed-band a first plurality of transmissions in the first group of contiguous transmission opportunities; where the first plurality of transmissions is associated with a plurality of different transport blocks (TBs); where each of the plurality of different TBs is associated with a hybrid automatic repeat request (HARQ) process identifier, a new data indicator (NDI), and a redundancy version (RV); and where each of the first set of sidelink transmission opportunities is associated with a type-1 LBT procedure. The transceiver is further configured to receive the first DCI in an unlicensed frequency band; where the first DCI is associated with an enhanced type 3-0 DCI; and where the first sidelink transmission opportunity is associated with a type-2 listen-before-talk (LBT) procedure.

Further aspects of the present disclosure include a base station (BS) including a processor configured to determine a first sidelink transmission opportunity for communicating in an unlicensed frequency band at a first listen-before-talk (LBT) time. The base station also includes a transceiver configured to. The base station also includes transmit, to a user equipment (UE) in a licensed frequency band, a first downlink control information (DCI) associated with the determined first sidelink transmission opportunity.

The BS may also include one or more of the following features. For instance, The BS where the transceiver is further configured to transmit the first DCI in a licensed frequency band; where the first DCI is further associated with a second LBT trigger opportunity; and where the transceiver is further configured to transmit, to the UE, a second LBT trigger associated with a second sidelink transmission opportunity for communicating in the unlicensed frequency band at a second LBT time based on the second LBT trigger opportunity. The second LBT trigger opportunity is associated with a time-frequency resource for transmitting the second LBT trigger based on the first DCI; where the second LBT trigger opportunity is associated with a trigger format based on the first DCI; where the first sidelink transmission opportunity is associated with a channel access priority class (CAPC) configuration based on the first DCI; and where the first sidelink transmission opportunity is associated with a cyclic prefix (CP) extension configuration based on the first DCI. The second sidelink transmission opportunity is associated with a type-2 LBT procedure. The second LBT trigger opportunity is associated with a pre-configured sidelink-band trigger; and where the pre-configured sidelink-band trigger is based on one of a system information block configuration, a radio resource control (RRC) message configuration, or a media access control control element (MAC-CE) message configuration. The first DCI is associated with a second set of one or more sidelink transmission opportunities contiguous with the determined second sidelink transmission opportunity; where a second group of contiguous transmission opportunities includes each of the determined second sidelink transmission opportunity and the second set of transmission opportunities; where the second group of contiguous transmission opportunities is associated with a plurality of different transport blocks (TBs); and where each of the plurality of different TBs is associated with a hybrid automatic repeat request (HARQ) process identifier, a new data indicator (NDI), and a redundancy version (RV). The second LBT time is prior to the first LBT time; where the first sidelink transmission opportunity is associated with a type-1 LBT procedure; and where the second sidelink transmission opportunity is associated a type-2 LBT procedure. The first LBT time is prior to the second LBT time; and where an ending time of the determined second sidelink transmission opportunity is based on one of an ending time of the first sidelink transmission opportunity or an overriding ending time of the second sidelink transmission opportunity; and where the ending time of the determined second sidelink transmission opportunity is based on one of the first DCI, a system information block, or a radio resource configuration (RRC) message. The second LBT trigger is associated with a simplified type 2-0 DCI; where the transceiver is further configured to transmit the second LBT trigger based on a common search space (CSS) configuration in the unlicensed frequency band; and where the CSS configuration is based on an enhanced system information block. The transceiver is further configured to transmit the second LBT trigger in a physical sidelink shared channel (PSSCH). The first DCI is associated with an enhanced type 3-0 DCI; and where the first sidelink transmission opportunity is associated with a type-1 LBT procedure. The transceiver is further configured to either transmit a system information block associated with a first cyclic prefix (CP) extension configuration for the first sidelink transmission opportunity; or transmit a radio resource control (RRC) message associated with a second cp extension configuration for the first sidelink transmission opportunity. The transceiver is further configured to either transmit a system information block associated with a first channel access priority class (CAPC) configuration for the first sidelink transmission opportunity; or transmit a radio resource control (RRC) message associated with a second CAPC configuration for the first sidelink transmission opportunity. The first DCI is associated with a first set of one or more sidelink transmission opportunities contiguous with the determined first sidelink transmission opportunity; where each of the first set of sidelink transmission opportunities is associated with a type-1 LBT procedure; where a first group of contiguous transmission opportunities includes each of the determined first sidelink transmission opportunity and the first set of transmission opportunities; where the first group of contiguous transmission opportunities is associated with a plurality of different transport blocks (TBs); and where each of the plurality of different TBs is associated with a hybrid automatic repeat request (HARQ) process identifier, a new data indicator (NDI), and a redundancy version (RV). The transceiver is further configured to transmit the first DCI in an unlicensed frequency band; where the first DCI is associated with an enhanced type 3-0 DCI; and where the first sidelink transmission opportunity is associated with a type-2 listen-before-talk (LBT) procedure.

Further aspects of the present disclosure include a non-transitory computer-readable medium having program code recorded thereon. The non-transitory computer-readable medium also includes receive, from a base station (BS), a first downlink control information (DCI) associated with a first listen-before-talk (LBT) time; and determine a first sidelink transmission opportunity for communicating in an unlicensed frequency band at the first LBT time based on the first DCI.

The non-transitory computer-readable medium may also include one or more of the following features. For instance, the non-transitory computer-readable medium includes where the program code, when executed by the processor in the first UE, may include code for causing the first UE to receive the first DCI in a licensed frequency band, where the first DCI is further associated with a second LBT trigger opportunity; receive, from a first wireless communication device, a second LBT trigger associated with a second LBT time based on the second LBT trigger opportunity; determine a second sidelink transmission opportunity for communicating in the unlicensed frequency band at the second LBT time based on the communicated second LBT trigger; and transmit, to a second wireless communication device, in an unlicensed-band a first transmission in a physical sidelink shared channel (PSSCH) at one of the first sidelink transmission opportunity or the second sidelink transmission opportunity. The second LBT trigger opportunity is associated with a time-frequency resource for detecting the second LBT trigger based on the first DCI; where the second LBT trigger opportunity is associated with a trigger format based on the first DCI; where the first sidelink transmission opportunity is associated with a cyclic prefix (CP) extension configuration based on the first DCI; where the first sidelink transmission opportunity is associated with a channel access priority class (CAPC) configuration based on the first DCI; and where the first wireless communication device is one of the BS, a transmission-and-reception point, or a proxy sidelink UE. The second sidelink transmission opportunity is associated with a type-2 LBT procedure. The second LBT trigger opportunity is further associated with a pre-configured sidelink-band trigger; and where the pre-configured sidelink-band trigger is based on one of a system information block configuration, a radio resource control (RRC) message configuration, or a media access control control element (MAC-CE) message configuration. The program code, when executed by the processor in the first UE, may include code for causing the first UE to determine a second set of one or more sidelink transmission opportunities contiguous with the determined second sidelink transmission opportunity based on the first DCI, where a second group of contiguous transmission opportunities includes each of the determined second sidelink transmission opportunity and the second set of transmission opportunities; and transmit, to a second wireless communication device, in an unlicensed-band a second plurality of transmissions in the second group of contiguous transmission opportunities; where the second plurality of transmissions is associated with a plurality of different transport blocks (TBs); where each of the plurality of different TBs is associated with a hybrid automatic repeat request (HARQ) process identifier, a new data indicator (NDI), and a redundancy version (RV). The second LBT time is prior to the first LBT time; where the first sidelink transmission opportunity is associated with a type-1 LBT procedure; where the second sidelink transmission opportunity is associated a type-2 LBT procedure; and where the program code, when executed by the processor in the first UE, may include code for causing the first UE to either transmit the first transmission in a physical sidelink shared channel (PSSCH) at the second sidelink transmission opportunity based on the type-2 LBT procedure associated with second first sidelink transmission opportunity being successful; or transmit the first transmission in a physical sidelink shared channel (PSSCH) at the first sidelink transmission opportunity based on the type-2 LBT procedure associated with the second sidelink transmission opportunity being unsuccessful. The first LBT time is prior to the second LBT time; and where an ending time of the determined second sidelink transmission opportunity is based on one of an ending time of the first sidelink transmission opportunity or an overriding ending time of the second sidelink transmission opportunity; and where the ending time of the determined second sidelink transmission opportunity is based on one of the first DCI, a system information block, or a radio resource configuration (RRC) message. The second LBT trigger is associated with a simplified type 2-0 DCI; where the program code, when executed by the processor in the first UE, may include code for causing the first UE to receive the second LBT trigger based on a common search space (CSS) configuration in the unlicensed frequency band; where the CSS configuration is based on an enhanced system information block; and where the first wireless communication device is the BS. The program code, when executed by the processor in the first UE, may include code for causing the first UE to receive the second LBT trigger in a physical sidelink shared channel (PSSCH). The first wireless communication device is a proxy sidelink UE; and where the second LBT trigger is associated with a type-1 LBT procedure. The first DCI is associated with an enhanced type 3-0 DCI; and where the first sidelink transmission opportunity is associated with a type-1 LBT procedure. The program code, when executed by the processor in the first UE, may include code for causing the first UE to determine a cyclic prefix (CP) extension configuration for the first sidelink transmission opportunity based on one of a system information block configuration or a radio resource control (RRC) message configuration. The program code, when executed by the processor in the first UE, may include code for causing the first UE to determine a channel access priority class (CAPC) configuration for the first sidelink transmission opportunity based on one of a system information block configuration or a radio resource control (RRC) message configuration. The program code, when executed by the processor in the first UE, may include code for causing the first UE to determine a first set of one or more sidelink transmission opportunities contiguous with the determined first sidelink transmission opportunity based on the first DCI, where a first group of contiguous transmission opportunities includes each of the determined first sidelink transmission opportunity and the first set of transmission opportunities; and transmit, to a second wireless communication device, in an unlicensed-band a first plurality of transmissions in the first group of contiguous transmission opportunities; where the first plurality of transmissions is associated with a plurality of different transport blocks (TBs); where each of the plurality of different TBs is associated with a hybrid automatic repeat request (HARQ) process identifier, a new data indicator (NDI), and a redundancy version (RV); and where each of the first set of sidelink transmission opportunities is associated with a type-1 LBT procedure. The program code, when executed by the processor in the first UE, may include code for causing the first UE to receive the first DCI in an unlicensed frequency band; where the first DCI is associated with an enhanced type 3-0 DCI; and where the first sidelink transmission opportunity is associated with a type-2 listen-before-talk (LBT) procedure.

Further aspects of the present disclosure include a non-transitory computer-readable medium having program code recorded thereon. The non-transitory computer-readable medium also includes determine a first sidelink transmission opportunity for communicating in an unlicensed frequency band at a first listen-before-talk (LBT) time. The non-transitory computer-readable medium also includes transmit, to a user equipment (UE) in a licensed frequency band, a first downlink control information (DCI) associated with the determined first sidelink transmission opportunity.

The non-transitory computer-readable medium may also include one or more of the following features. For instance, the non-transitory computer-readable medium includes where the program code, when executed by the processor in the BS, may include code for causing the BS to transmit the first DCI in a licensed frequency band, where the first DCI is further associated with a second LBT trigger opportunity; and transmit, to the UE, a second LBT trigger associated with a second sidelink transmission opportunity for communicating in the unlicensed frequency band at a second LBT time based on the second LBT trigger opportunity. The second LBT trigger opportunity is associated with a time-frequency resource for transmitting the second LBT trigger based on the first DCI; where the second LBT trigger opportunity is associated with a trigger format based on the first DCI; where the first sidelink transmission opportunity is associated with a channel access priority class (CAPC) configuration based on the first DCI; and where the first sidelink transmission opportunity is associated with a cyclic prefix (CP) extension configuration based on the first DCI. The second sidelink transmission opportunity is associated with a type-2 LBT procedure. The second LBT trigger opportunity is further associated with a pre-configured sidelink-band trigger; and where the pre-configured sidelink-band trigger is based on one of a system information block configuration, a radio resource control (RRC) message configuration, or a media access control control element (MAC-CE) message configuration. The first DCI is associated with a second set of one or more sidelink transmission opportunities contiguous with the determined second sidelink transmission opportunity; where a second group of contiguous transmission opportunities includes each of the determined second sidelink transmission opportunity and the second set of transmission opportunities; where the second group of contiguous transmission opportunities is associated with a plurality of different transport blocks (TBs); and where each of the plurality of different TBs is associated with a hybrid automatic repeat request (HARQ) process identifier, a new data indicator (NDI), and a redundancy version (RV). The second LBT time is prior to the first LBT time; where the first sidelink transmission opportunity is associated with a type-1 LBT procedure; where the second sidelink transmission opportunity is associated a type-2 LBT procedure. The first LBT time is prior to the second LBT time; and where an ending time of the determined second sidelink transmission opportunity is based on one of an ending time of the first sidelink transmission opportunity or an overriding ending time of the second sidelink transmission opportunity; and where the ending time of the determined second sidelink transmission opportunity is based on one of the first DCI, a system information block, or a radio resource configuration (RRC) message. The second LBT trigger is associated with a simplified type 2-0 DCI; where the program code, when executed by the processor in the BS, may include code for causing the BS to transmit the second LBT trigger based on a common search space (CSS) configuration in the unlicensed frequency band; where the CSS configuration is based on an enhanced system information block. The program code, when executed by the processor in the BS, may include code for causing the BS to transmit the second LBT trigger in a physical sidelink shared channel (PSSCH). The first DCI is associated with an enhanced type 3-0 DCI; and where the first sidelink transmission opportunity is associated with a type-1 LBT procedure. The program code, when executed by the processor in the BS, may include code for causing the BS to either transmit a system information block associated with a first cyclic prefix (CP) extension configuration for the first sidelink transmission opportunity; or transmit a radio resource control (RRC) message associated with a second cp extension configuration for the first sidelink transmission opportunity. The program code, when executed by the processor in the BS, may include code for causing the BS to either transmit a system information block associated with a first channel access priority class (CAPC) configuration for the first sidelink transmission opportunity; or transmit a radio resource control (RRC) message associated with a second CAPC configuration for the first sidelink transmission opportunity. The first DCI is associated with a first set of one or more sidelink transmission opportunities contiguous with the determined first sidelink transmission opportunity; where each of the first set of sidelink transmission opportunities is associated with a type-1 LBT procedure; where a first group of contiguous transmission opportunities includes each of the determined first sidelink transmission opportunity and the first set of transmission opportunities; where the first group of contiguous transmission opportunities is associated with a plurality of different transport blocks (TBs); and where each of the plurality of different TBs is associated with a hybrid automatic repeat request (HARQ) process identifier, a new data indicator (NDI), and a redundancy version (RV). The program code, when executed by the processor in the BS, may include code for causing the BS to transmit the first DCI in an unlicensed frequency band; where the first DCI is associated with an enhanced type 3-0 DCI; and where the first sidelink transmission opportunity is associated with a type-2 listen-before-talk (LBT) procedure.

Further aspects of the present disclosure include a first user equipment (UE). The first user equipment includes means for receiving, from a base station (BS), a first downlink control information (DCI) associated with a first listen-before-talk (LBT) time; and means for determining a first sidelink transmission opportunity for communicating in an unlicensed frequency band at the first LBT time based on the first DCI.

The first UE may also include one or more of the following features. For instance, The first UE includes where the means for receiving the first DCI further includes means for receiving the first DCI in a licensed frequency band; where the first DCI is further associated with a second LBT trigger opportunity; where the first UE further includes means for receiving, from a first wireless communication device, a second LBT trigger associated with a second LBT time based on the second LBT trigger opportunity; means for determining a second sidelink transmission opportunity for communicating in the unlicensed frequency band at the second LBT time based on the communicated second LBT trigger; and means for transmitting, to a second wireless communication device, in an unlicensed-band a first transmission in a physical sidelink shared channel (PSSCH) at one of the first sidelink transmission opportunity or the second sidelink transmission opportunity. The second LBT trigger opportunity is associated with a time-frequency resource for detecting the second LBT trigger based on the first DCI; where the second LBT trigger opportunity is associated with a trigger format based on the first DCI; where the first sidelink transmission opportunity is associated with a cyclic prefix (CP) extension configuration based on the first DCI; where the first sidelink transmission opportunity is associated with a channel access priority class (CAPC) configuration based on the first DCI; and where the first wireless communication device is one of the BS, a transmission-and-reception point, or a proxy sidelink UE. The second sidelink transmission opportunity is associated with a type-2 LBT procedure. The second LBT trigger opportunity is further associated with a pre-configured sidelink-band trigger; and where the pre-configured sidelink-band trigger is based on one of a system information block configuration, a radio resource control (RRC) message configuration, or a media access control control element (MAC-CE) message configuration. The first UE further includes means for determining a second set of one or more sidelink transmission opportunities contiguous with the determined second sidelink transmission opportunity based on the first DCI, where a second group of contiguous transmission opportunities includes each of the determined second sidelink transmission opportunity and the second set of transmission opportunities; and means for transmitting, to a second wireless communication device, in an unlicensed-band a second plurality of transmissions in the second group of contiguous transmission opportunities; where the second plurality of transmissions is associated with a plurality of different transport blocks (TBs); where each of the plurality of different TBs is associated with a hybrid automatic repeat request (HARQ) process identifier, a new data indicator (NDI), and a redundancy version (RV). The second LBT time is prior to the first LBT time; where the first sidelink transmission opportunity is associated with a type-1 LBT procedure; where the second sidelink transmission opportunity is associated a type-2 LBT procedure; and where the means for transmitting the first transmission further includes one of means for transmitting the first transmission in a physical sidelink shared channel (PSSCH) at the second sidelink transmission opportunity based on the type-2 LBT procedure associated with second first sidelink transmission opportunity being successful; or means for transmitting the first transmission in a physical sidelink shared channel (PSSCH) at the first sidelink transmission opportunity based on the type-2 LBT procedure associated with the second sidelink transmission opportunity being unsuccessful. The first LBT time is prior to the second LBT time; and where an ending time of the determined second sidelink transmission opportunity is based on one of an ending time of the first sidelink transmission opportunity or an overriding ending time of the second sidelink transmission opportunity; and where the ending time of the determined second sidelink transmission opportunity is based on one of the first DCI, a system information block, or a radio resource configuration (RRC) message. The second LBT trigger is associated with a simplified type 2-0 DCI; where the means for receiving the second LBT trigger further includes means for receiving the second LBT trigger based on a common search space (CSS) configuration in the unlicensed frequency band; where the CSS configuration is based on an enhanced system information block; and where the first wireless communication device is the BS. The means for receiving the second LBT trigger further includes means for receiving the second LBT trigger in a physical sidelink shared channel (PSSCH). The first wireless communication device is a proxy sidelink UE; and where the second LBT trigger is associated with a type-1 LBT procedure. The first DCI is associated with an enhanced type 3-0 DCI; and where the first sidelink transmission opportunity is associated with a type-1 LBT procedure. The first UE further includes means for determining a cyclic prefix (CP) extension configuration for the first sidelink transmission opportunity based on one of a system information block configuration or a radio resource control (RRC) message configuration. The first UE further includes means for determining a channel access priority class (CAPC) configuration for the first sidelink transmission opportunity based on one of a system information block configuration or a radio resource control (RRC) message configuration. The first UE further includes means for determining a first set of one or more sidelink transmission opportunities contiguous with the determined first sidelink transmission opportunity based on the first DCI, where a first group of contiguous transmission opportunities includes each of the determined first sidelink transmission opportunity and the first set of transmission opportunities; and means for transmitting, to a second wireless communication device, in an unlicensed-band a first plurality of transmissions in the first group of contiguous transmission opportunities; where the first plurality of transmissions is associated with a plurality of different transport blocks (TBs); where each of the plurality of different TBs is associated with a hybrid automatic repeat request (HARQ) process identifier, a new data indicator (NDI), and a redundancy version (RV); and where each of the first set of sidelink transmission opportunities is associated with a type-1 LBT procedure. The means for receiving the first DCI further includes means for receiving the first DCI in an unlicensed frequency band; where the first DCI is associated with an enhanced type 3-0 DCI; and where the first sidelink transmission opportunity is associated with a type-2 listen-before-talk (LBT) procedure.

Further aspects of the present disclosure include a base station (BS). The base station includes means for determining a first sidelink transmission opportunity for communicating in an unlicensed frequency band at a first listen-before-talk (LBT) time. The base station also includes means for transmitting, to a user equipment (UE) in a licensed frequency band, a first downlink control information (DCI) associated with the determined first sidelink transmission opportunity.

The BS may also include one or more of the following features. For instance, the BS includes where the means for transmitting the first DCI further includes means for transmitting the first DCI in a licensed frequency band; where the first DCI is further associated with a second LBT trigger opportunity; where the BS further includes means for transmitting, to the UE, a second LBT trigger associated with a second sidelink transmission opportunity for communicating in the unlicensed frequency band at a second LBT time based on the second LBT trigger opportunity. The second LBT trigger opportunity is associated with a time-frequency resource for transmitting the second LBT trigger based on the first DCI; where the second LBT trigger opportunity is associated with a trigger format based on the first DCI; where the first sidelink transmission opportunity is associated with a channel access priority class (CAPC) configuration based on the first DCI; and where the first sidelink transmission opportunity is associated with a cyclic prefix (CP) extension configuration based on the first DCI. The second sidelink transmission opportunity is associated with a type-2 LBT procedure. The second LBT trigger opportunity is further associated with a pre-configured sidelink-band trigger; and where the pre-configured sidelink-band trigger is based on one of a system information block configuration, a radio resource control (RRC) message configuration, or a media access control control element (MAC-CE) message configuration. The first DCI is associated with a second set of one or more sidelink transmission opportunities contiguous with the determined second sidelink transmission opportunity; where a second group of contiguous transmission opportunities includes each of the determined second sidelink transmission opportunity and the second set of transmission opportunities; where the second group of contiguous transmission opportunities is associated with a plurality of different transport blocks (TBs); and where each of the plurality of different TBs is associated with a hybrid automatic repeat request (HARQ) process identifier, a new data indicator (NDI), and a redundancy version (RV). The second LBT time is prior to the first LBT time; where the first sidelink transmission opportunity is associated with a type-1 LBT procedure; where the second sidelink transmission opportunity is associated a type-2 LBT procedure. The first LBT time is prior to the second LBT time; and where an ending time of the determined second sidelink transmission opportunity is based on one of an ending time of the first sidelink transmission opportunity or an overriding ending time of the second sidelink transmission opportunity; and where the ending time of the determined second sidelink transmission opportunity is based on one of the first DCI, a system information block, or a radio resource configuration (RRC) message. The second LBT trigger is associated with a simplified type 2-0 DCI; where the means for transmitting the second LBT trigger further includes means for transmitting the second LBT trigger based on a common search space (CSS) configuration in the unlicensed frequency band; where the CSS configuration is based on an enhanced system information block. The means for transmitting the second LBT trigger further includes means for transmitting the second LBT trigger in a physical sidelink shared channel (PSSCH). The first DCI is associated with an enhanced type 3-0 DCI; and where the first sidelink transmission opportunity is associated with a type-1 LBT procedure. The BS further includes either means for transmitting a system information block associated with a first cyclic prefix (CP) extension configuration for the first sidelink transmission opportunity; or means for transmitting a radio resource control (RRC) message associated with a second cp extension configuration for the first sidelink transmission opportunity. The BS further includes either means for transmitting a system information block associated with a first channel access priority class (CAPC) configuration for the first sidelink transmission opportunity; or means for transmitting a radio resource control (RRC) message associated with a second CAPC configuration for the first sidelink transmission opportunity. The first DCI is associated with a first set of one or more sidelink transmission opportunities contiguous with the determined first sidelink transmission opportunity; where each of the first set of sidelink transmission opportunities is associated with a type-1 LBT procedure; where a first group of contiguous transmission opportunities includes each of the determined first sidelink transmission opportunity and the first set of transmission opportunities; where the first group of contiguous transmission opportunities is associated with a plurality of different transport blocks (TBs); and where each of the plurality of different TBs is associated with a hybrid automatic repeat request (HARQ) process identifier, a new data indicator (NDI), and a redundancy version (RV). The means for transmitting the first DCI further includes means for transmitting the first DCI in an unlicensed frequency band; where the first DCI is associated with an enhanced type 3-0 DCI; and where the first sidelink transmission opportunity is associated with a type-2 listen-before-talk (LBT) procedure.

Further aspects of the present disclosure are provided below:

1. A method of wireless communication performed by a first user equipment (UE), comprising:
   receiving, by the UE from a base station (BS), a first downlink control information (DCI) associated with a first listen-before-talk (LBT) time; and
   determining, by the UE, a first sidelink transmission opportunity for communicating in an unlicensed frequency band at the first LBT time based on the first DCI.

2. The method of aspect 1, wherein:
   the receiving the first DCI comprises:
   receiving the first DCI in a licensed frequency band;
   the first DCI is further associated with a second LBT trigger opportunity;
   the method further comprises:
   receiving, by the UE from a first wireless communication device, a second LBT trigger associated with a second LBT time based on the second LBT trigger opportunity;
   determining, by the UE, a second sidelink transmission opportunity for communicating in the unlicensed frequency band at the second LBT time based on the communicated second LBT trigger; and
   transmitting, by the UE to a second wireless communication device, in an unlicensed-band a first transmission in a physical sidelink shared channel (PSSCH) at one of the first sidelink transmission opportunity or the second sidelink transmission opportunity.

3. The method of any of aspects 1-2, wherein:
   the second LBT trigger opportunity is associated with a time-frequency resource for detecting the second LBT trigger based on the first DCI;
   the second LBT trigger opportunity is associated with a trigger format based on the first DCI;
   the first sidelink transmission opportunity is associated with at least one of a cyclic prefix (CP) extension configuration or a channel access priority class (CAPC) configuration based on the first DCI; and
   the first wireless communication device is one of the BS, a transmission-and-reception point, or a proxy sidelink UE.

4. The method of any of aspects 1-3, wherein the second sidelink transmission opportunity is associated with a type-2 LBT procedure.

5. The method of any of aspects 1-4, wherein:
   the second LBT trigger opportunity is further associated with a pre-configured sidelink-band trigger; and
   the pre-configured sidelink-band trigger is based on one of a system information block configuration, a radio resource control (RRC) message configuration, or a media access control control element (MAC-CE) message configuration.

6. The method of any of aspects 1-5, further comprising:
   determining, by the UE, a set of one or more sidelink transmission opportunities contiguous with the determined second sidelink transmission opportunity based on the first DCI, wherein a group of contiguous transmission opportunities includes each of the determined second sidelink transmission opportunity and the set of one or more sidelink transmission opportunities; and
   transmitting, by the UE to a second wireless communication device, in an unlicensed-band a plurality of transmissions in the group of contiguous transmission opportunities, wherein the plurality of transmissions is associated with a plurality of different transport blocks (TBs), and wherein each of the plurality of different TBs is associated with a hybrid automatic repeat request (HARQ) process identifier, a new data indicator (NDI), and a redundancy version (RV).

7. The method of any of aspects 1-6, wherein:
   the second LBT time is prior to the first LBT time;
   the first sidelink transmission opportunity is associated with a type-1 LBT procedure;
   the second sidelink transmission opportunity is associated a type-2 LBT procedure; and
   the transmitting the first transmission comprises one of:
   transmitting the first transmission in a physical sidelink shared channel (PSSCH) at the second sidelink transmission opportunity based on the type-2 LBT procedure associated with second first sidelink transmission opportunity being successful; or
   transmitting the first transmission in a physical sidelink shared channel (PSSCH) at the first sidelink transmission opportunity based on the type-2 LBT procedure associated with the second sidelink transmission opportunity being unsuccessful.

8. The method of any of aspects 1-6, wherein:
   the first LBT time is prior to the second LBT time;
   an ending time of the determined second sidelink transmission opportunity is based on one of an ending time of the first sidelink transmission opportunity or an overriding ending time of the second sidelink transmission opportunity; and
   the ending time of the determined second sidelink transmission opportunity is based on one of the first DCI, a system information block, or a radio resource configuration (RRC) message.

9. The method of any of aspects 1-8, wherein:
   the second LBT trigger is associated with a simplified type 2-0 DCI;
   the receiving the second LBT trigger comprises:
   receiving the second LBT trigger based on a common search space (CSS) configuration in the unlicensed frequency band;
   the CSS configuration is based on an enhanced system information block; and
   the first wireless communication device is the BS.

10. The method of any of aspects 1-9, wherein:
    the first DCI is associated with an enhanced type 3-0 DCI; and
    the first sidelink transmission opportunity is associated with a type-1 LBT procedure.

11. The method of any of aspects 1-5 or 8-10, further comprising:
    determining, by the UE, a cyclic prefix (CP) extension configuration for the first sidelink transmission opportunity based on one of a system information block configuration or a radio resource control (RRC) message configuration.

12. The method of any of aspects 1-5 or 8-11, further comprising:
  determining, by the UE, a channel access priority class (CAPC) configuration for the first sidelink transmission opportunity based on one of a system information block configuration or a radio resource control (RRC) message configuration.

13. The method of any of aspects 1-5 or 8-12, further comprising:
  determining, by the UE, a set of one or more sidelink transmission opportunities contiguous with the determined first sidelink transmission opportunity based on the first DCI, wherein a group of contiguous transmission opportunities includes each of the determined first sidelink transmission opportunity and the set of one or more sidelink transmission opportunities; and
  transmitting, by the UE to a second wireless communication device, in an unlicensed-band a first plurality of transmissions in the group of contiguous transmission opportunities, wherein the first plurality of transmissions is associated with a plurality of different transport blocks (TBs), wherein each of the plurality of different TBs is associated with a hybrid automatic repeat request (HARQ) process identifier, new data indicator (NDI), and a redundancy version (RV), and wherein each of the set of one or more sidelink transmission opportunities is associated with a type-1 LBT procedure.

14. The method of any of aspects 1 or 11-13, wherein:
  the receiving the first DCI comprises:
    receiving the first DCI in an unlicensed frequency band;
    the first DCI is associated with an enhanced type 3-0 DCI; and
    the first sidelink transmission opportunity is associated with a type-2 listen-before-talk (LBT) procedure.

15. An apparatus comprising a processor coupled to a transceiver, wherein the processor and transceiver are configured to perform the method of any one of aspects 1-14.

16. An apparatus comprising means for performing the method of any one of aspects 1-14.

17. A non-transitory computer readable medium including program code, which when executed by one or more processors, causes a user equipment (UE) to perform the method of any one of aspects 1-14.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first user equipment (UE), comprising:
  receiving, by the UE from a base station (BS), a first downlink control information (DCI) associated with a first listen-before-talk (LBT) time, wherein the first DCI is associated with a cyclic prefix (CP) extension, and wherein the CP extension is associated with a traffic priority; and
  determining, by the UE, a start time of a first sidelink transmission opportunity for communicating in an unlicensed frequency band at the first LBT time based on the traffic priority associated with the CP extension.

2. The method of claim 1, wherein:
  the receiving the first DCI comprises:
    receiving the first DCI in a licensed frequency band;
    the first DCI is further associated with a second LBT trigger opportunity;
  the method further comprises:
    receiving, by the UE from a first wireless communication device, a second LBT trigger associated with a second LBT time based on the second LBT trigger opportunity;
    determining, by the UE, a second sidelink transmission opportunity for communicating in the unlicensed frequency band at the second LBT time based on the communicated second LBT trigger; and
    transmitting, by the UE to a second wireless communication device, in an unlicensed-band a first transmission in a physical sidelink shared channel (PSSCH) at one of the first sidelink transmission opportunity or the second sidelink transmission opportunity.

3. The method of claim 2, wherein:
  the second LBT trigger opportunity is associated with a time-frequency resource for detecting the second LBT trigger based on the first DCI;

the second LBT trigger opportunity is associated with a trigger format based on the first DCI; and the first wireless communication device is one of the BS, a transmission-and-reception point, or a proxy sidelink UE.

4. The method of claim 2, wherein the second sidelink transmission opportunity is associated with a type-2 LBT procedure.

5. The method of claim 2, wherein:
the second LBT trigger opportunity is further associated with a pre-configured sidelink-band trigger; and
the pre-configured sidelink-band trigger is based on one of a system information block configuration, a radio resource control (RRC) message configuration, or a media access control control element (MAC-CE) message configuration.

6. The method of claim 2, further comprising:
determining, by the UE, a set of one or more sidelink transmission opportunities contiguous with the determined second sidelink transmission opportunity based on the first DCI,
wherein a group of contiguous transmission opportunities includes each of the determined second sidelink transmission opportunity and the set of one or more sidelink transmission opportunities; and
transmitting, by the UE to a second wireless communication device, in an unlicensed-band a plurality of transmissions in the group of contiguous transmission opportunities, wherein the plurality of transmissions is associated with a plurality of different transport blocks (TBs), and wherein each of the plurality of different TB s is associated with a hybrid automatic repeat request (HARQ) process identifier, a new data indicator (NDI), and a redundancy version (RV).

7. The method of claim 2, wherein:
the second LBT time is prior to the first LBT time;
the first sidelink transmission opportunity is associated with a type-1 LBT procedure;
the second sidelink transmission opportunity is associated a type-2 LBT procedure; and
the transmitting the first transmission comprises one of:
transmitting the first transmission in a physical sidelink shared channel (PSSCH) at the second sidelink transmission opportunity based on the type-2 LBT procedure associated with second first sidelink transmission opportunity being successful; or
transmitting the first transmission in a physical sidelink shared channel (PSSCH) at the first sidelink transmission opportunity based on the type-2 LBT procedure associated with the second sidelink transmission opportunity being unsuccessful.

8. The method of claim 2, wherein:
the first LBT time is prior to the second LBT time;
an ending time of the determined second sidelink transmission opportunity is based on one of an ending time of the first sidelink transmission opportunity or an overriding ending time of the second sidelink transmission opportunity; and
the ending time of the determined second sidelink transmission opportunity is based on one of the first DCI, a system information block, or a radio resource configuration (RRC) message.

9. The method of claim 2, wherein:
the second LBT trigger is associated with a simplified type 2-0 DCI;
the receiving the second LBT trigger comprises:
receiving the second LBT trigger based on a common search space (CSS) configuration in the unlicensed frequency band;
the CSS configuration is based on an enhanced system information block; and
the first wireless communication device is the BS.

10. The method of claim 1, wherein:
the first DCI is associated with an enhanced type 3-0 DCI; and
the first sidelink transmission opportunity is associated with a type-1 LBT procedure.

11. The method of claim 1, further comprising:
determining, by the UE, a cyclic prefix (CP) extension configuration for the first sidelink transmission opportunity based on one of a system information block configuration or a radio resource control (RRC) message configuration.

12. The method of claim 1, further comprising:
determining, by the UE, a channel access priority class (CAPC) configuration for the first sidelink transmission opportunity based on one of a system information block configuration or a radio resource control (RRC) message configuration.

13. The method of claim 1, further comprising:
determining, by the UE, a set of one or more sidelink transmission opportunities contiguous with the determined first sidelink transmission opportunity based on the first DCI, wherein a group of contiguous transmission opportunities includes each of the determined first sidelink transmission opportunity and the set of one or more sidelink transmission opportunities; and
transmitting, by the UE to a second wireless communication device, in an unlicensed-band a first plurality of transmissions in the group of contiguous transmission opportunities, wherein the first plurality of transmissions is associated with a plurality of different transport blocks (TBs), wherein each of the plurality of different TBs is associated with a hybrid automatic repeat request (HARQ) process identifier, new data indicator (NDI), and a redundancy version (RV), and wherein each of the set of one or more sidelink transmission opportunities is associated with a type-1 LBT procedure.

14. The method of claim 1, wherein:
the receiving the first DCI comprises:
receiving the first DCI in an unlicensed frequency band;
the first DCI is associated with an enhanced type 3-0 DCI; and
the first sidelink transmission opportunity is associated with a type-2 listen-before-talk (LBT) procedure.

15. A first user equipment (UE) comprising:
a transceiver configured to:
receive, from a base station (BS), a first downlink control information (DCI) associated with a first listen-before-talk (LBT) time, wherein the first DCI is associated with a cyclic prefix (CP) extension, and wherein the CP extension is associated with a traffic priority;
and
a processor coupled to the transceiver, wherein the processor is configured to:
determine a start time of a first sidelink transmission opportunity for communicating in an unlicensed frequency band at the first LBT time based on the traffic priority associated with the CP extension.

16. The first UE of claim 15, wherein:
the transceiver is further configured to:
receive the first DCI in a licensed frequency band, wherein the first DCI is further associated with a second LBT trigger opportunity; and
receive, from a first wireless communication device, a second LBT trigger associated with a second LBT time based on the second LBT trigger opportunity;
the processor is further configured to:
determine a second sidelink transmission opportunity for communicating in the unlicensed frequency band at the second LBT time based on the communicated second LBT trigger; and
the transceiver is further configured to:
transmit, to a second wireless communication device, in an unlicensed-band a first transmission in a physical sidelink shared channel (PSSCH) at one of the first sidelink transmission opportunity or the second sidelink transmission opportunity.

17. The first UE of claim 16 wherein:
the second LBT trigger opportunity is associated with a time-frequency resource for detecting the second LBT trigger based on the first DCI;
the second LBT trigger opportunity is associated with a trigger format based on the first DCI; and
the first wireless communication device is one of the BS, a transmission-and-reception point, or a proxy sidelink UE.

18. The first UE of claim 15, wherein:
the first DCI is associated with an enhanced type 3-0 DCI; and
the first sidelink transmission opportunity is associated with a type-1 LBT procedure.

19. The first UE of claim 16, wherein:
the second LBT trigger opportunity is further associated with a pre-configured sidelink-band trigger; and
the pre-configured sidelink-band trigger is based on one of a system information block configuration, a radio resource control (RRC) message configuration, or a media access control control element (MAC-CE) message configuration.

20. The first UE of claim 16, wherein:
the second LBT time is prior to the first LBT time;
the first sidelink transmission opportunity is associated with a type-1 LBT procedure;
the second sidelink transmission opportunity is associated a type-2 LBT procedure; and
the transceiver is further configured to:
transmit the first transmission in a physical sidelink shared channel (PSSCH) at the second sidelink transmission opportunity based on the type-2 LBT procedure associated with second first sidelink transmission opportunity being successful; or
transmit the first transmission in a physical sidelink shared channel (PSSCH) at the first sidelink transmission opportunity based on the type-2 LBT procedure associated with the second sidelink transmission opportunity being unsuccessful.

21. The first UE of claim 16, wherein:
the first LBT time is prior to the second LBT time;
an ending time of the determined second sidelink transmission opportunity is based on one of an ending time of the first sidelink transmission opportunity or an overriding ending time of the second sidelink transmission opportunity; and
the ending time of the determined second sidelink transmission opportunity is based on one of the first DCI, a system information block, or a radio resource configuration (RRC) message.

22. The first UE of claim 16, wherein:
the second LBT trigger is associated with a simplified type 2-0 DCI;
the transceiver is further configured to:
receive the second LBT trigger based on a common search space (CSS) configuration in the unlicensed frequency band;
the CSS configuration is based on an enhanced system information block; and
the first wireless communication device is the BS.

23. The first UE of claim 16, wherein the second sidelink transmission opportunity is associated with a type-2 LBT procedure.

24. The first UE of claim 15, wherein the processor is further configured to:
determine a cyclic prefix (CP) extension configuration for the first sidelink transmission opportunity based on one of a system information block configuration or a radio resource control (RRC) message configuration.

25. The first UE of claim 15, wherein the processor is further configured to:
determine a channel access priority class (CAPC) configuration for the first sidelink transmission opportunity based on one of a system information block configuration or a radio resource control (RRC) message configuration.

26. The first UE of claim 15, wherein the transceiver is further configured to:
receive the first DCI in an unlicensed frequency band;
wherein the first DCI is associated with an enhanced type 3-0 DCI; and
wherein the first sidelink transmission opportunity is associated with a type-2 listen-before-talk (LBT) procedure.

27. A first user equipment (UE), comprising:
means for receiving, from a base station (BS), a first downlink control information (DCI) associated with a first listen-before-talk (LBT) time, wherein the first DCI is associated with a cyclic prefix (CP) extension, and wherein the CP extension is associated with a traffic priority; and
means for determining a start time of a first sidelink transmission opportunity for communicating in an unlicensed frequency band at the first LBT time based on the traffic priority associated with the CP extension.

28. The first UE of claim 27, wherein:
the means for receiving the first DCI comprises:
means for receiving the first DCI in a licensed frequency band;
the first DCI is further associated with a second LBT trigger opportunity;
the first UE further comprises:
means for receiving, from a first wireless communication device, a second LBT trigger associated with a second LBT time based on the second LBT trigger opportunity;
means for determining a second sidelink transmission opportunity for communicating in the unlicensed frequency band at the second LBT time based on the communicated second LBT trigger; and
means for transmitting, to a second wireless communication device, in an unlicensed-band a first transmission in a physical sidelink shared channel (PSSCH) at one of the first sidelink transmission opportunity or the second sidelink transmission opportunity.

29. The first UE of claim 28, wherein:

the second LBT trigger opportunity is associated with a time-frequency resource for detecting the second LBT trigger based on the first DCI;

the second LBT trigger opportunity is associated with a trigger format based on the first DCI;

and the first wireless communication device is one of the BS, a transmission-and-reception point, or a proxy sidelink UE.

30. A base station (BS), comprising:

a processor configured to:
   determine a start time of a first sidelink transmission opportunity for communicating in an unlicensed frequency band at a first listen-before-talk (LBT) time;

and a transceiver coupled to the processor, wherein the transceiver is configured to:
   transmit, to a user equipment (UE) in a licensed frequency band, a first downlink control information (DCI) associated with the determined first sidelink transmission opportunity, the DCI indicating a cyclic prefix (CP) extension, wherein the start time of the first sidelink transmission opportunity is based on a traffic priority associated with the CP extension.

* * * * *